United States Patent
Sasaki et al.

(10) Patent No.: US 6,580,571 B2
(45) Date of Patent: Jun. 17, 2003

(54) LENS APPARATUS

(75) Inventors: Tadashi Sasaki, Saitama (JP); Syunichiro Ouchi, Saitama (JP); Keiji Kaneko, Saitama (JP); Minoru Tanaka, Saitama (JP); Atsushi Kanayama, Saitama (JP)

(73) Assignee: Fuji Photo Optical Co., Ltd, Saitama (JP)

(*) Notice: Subject to any disclaimer, the term of this patent is extended or adjusted under 35 U.S.C. 154(b) by 20 days.

(21) Appl. No.: 09/963,560

(22) Filed: Sep. 27, 2001

(65) Prior Publication Data

US 2002/0039242 A1 Apr. 4, 2002

(30) Foreign Application Priority Data

| Sep. 29, 2000 | (JP) | ................................ | 2000-300665 |
| Sep. 29, 2000 | (JP) | ................................ | 2000-300666 |
| Sep. 29, 2000 | (JP) | ................................ | 2000-300667 |
| Sep. 29, 2000 | (JP) | ................................ | 2000-300668 |

(51) Int. Cl.$^7$ ................ G02B 7/02; G02B 15/14; G03B 17/00; G03B 3/00; G03B 3/10
(52) U.S. Cl. ................ 359/823; 359/824; 359/694; 359/696; 359/697; 359/698; 396/79; 396/129; 396/131; 396/137
(58) Field of Search .................. 359/823, 824, 359/694, 696, 697, 698; 396/79, 129, 131, 137; 348/240.99, 240.3, 357, 345; 352/140

(56) References Cited

U.S. PATENT DOCUMENTS

| 4,153,903 A | * | 5/1979 | Pizzuti et al. ............ 396/105 |
| 4,461,544 A | * | 7/1984 | Isobe et al. ............... 359/698 |
| 4,491,396 A | * | 1/1985 | Isobe et al. ............... 359/698 |
| 4,534,629 A | * | 8/1985 | Bogle et al. .............. 352/140 |
| 5,715,101 A | * | 2/1998 | Nakamura et al. ......... 359/823 |
| 5,872,661 A | * | 2/1999 | Suzuki et al. ............. 359/698 |
| 5,978,161 A | * | 11/1999 | Lemke ...................... 359/824 |

FOREIGN PATENT DOCUMENTS

JP           01158881 A     6/1989

\* cited by examiner

*Primary Examiner*—Evelyn Lester
*Assistant Examiner*—Jack Dinh
(74) *Attorney, Agent, or Firm*—Birch, Stewart, Kolasch & Birch, LLP

(57) ABSTRACT

The lens apparatus permits rapid focusing by the operator demanding an autofocus start-up direction to carry out AF in the direction in an AF mode. When a start of the AF mode is instructed, an AF standby state of waiting for the operator to demand the AF start-up direction by operating a focus operation member, thereby permitting the operator to properly demand the AF start-up direction, and permitting the demand to be appropriately detected. When automatically switching from the state where the operator operates the focus operation member to the AF, condition of the switching is that a focus evaluation value exceeds a predetermined threshold based on the operation of the focus operation member, or that an operation amount of the focus operation member is changed more then a predetermined amount, thereby permitting further rapid focusing and improvement of operability. Gradually switching a clutch, which switches the focus lens driving from manual to electrical operation, from a manual to electrical state in switching to the AF can eliminates uncomfortable operation feeling of the focus operation member. Further, for the processing after completion of focusing by the AF, a mode of returning to the AF standby state of waiting for the operator to demand the AF start-up direction, mode of returning to a manual mode, or mode of continuing the AF can be selected, which permits improvement of convenience of the AF mode.

17 Claims, 24 Drawing Sheets

F I G. 1
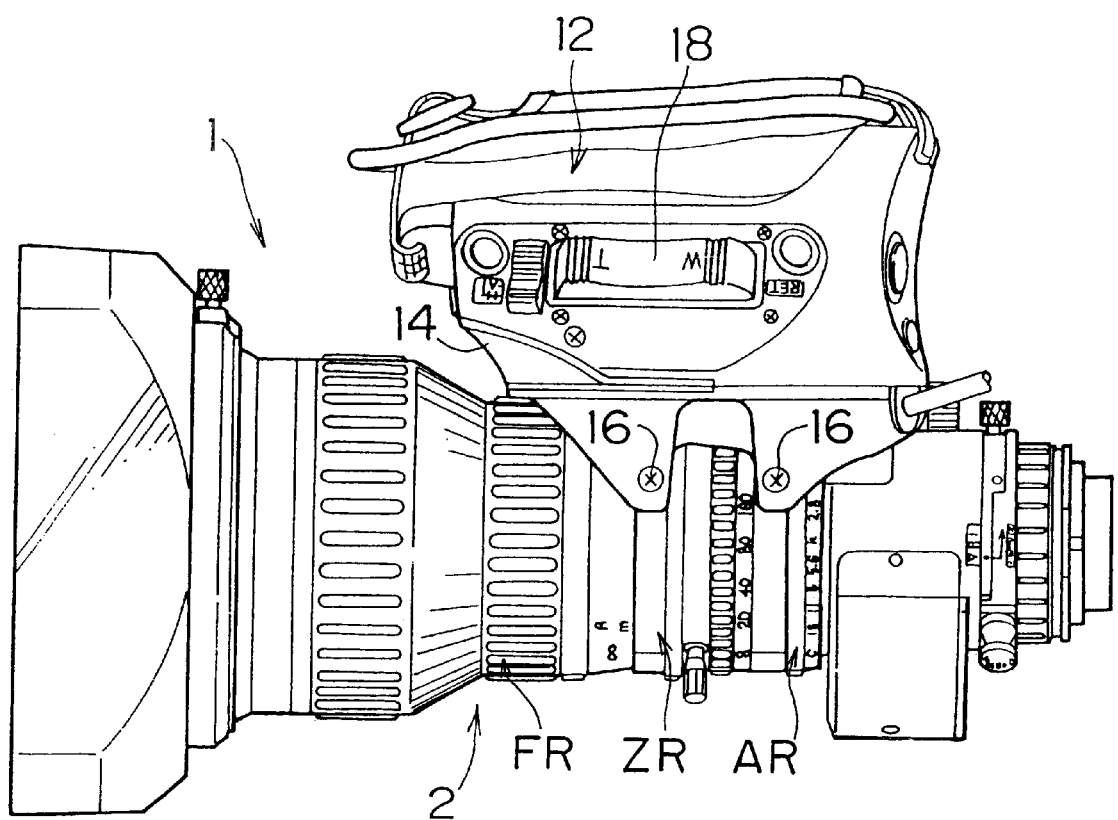

F I G. 3
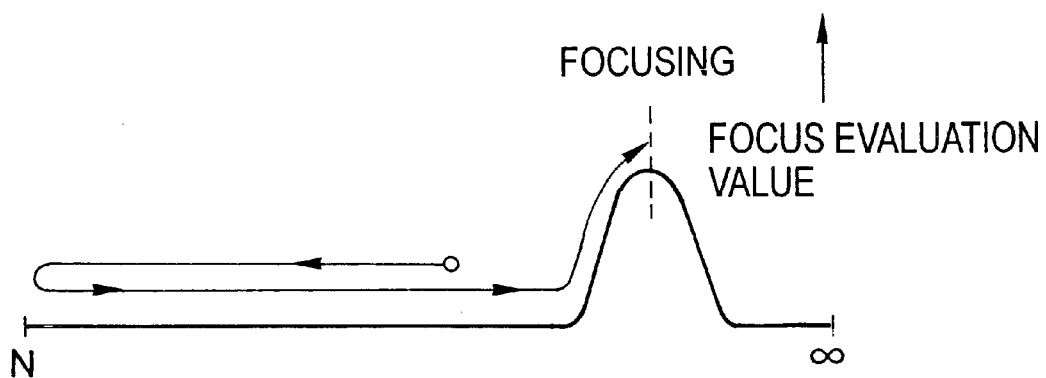
F I G. 4
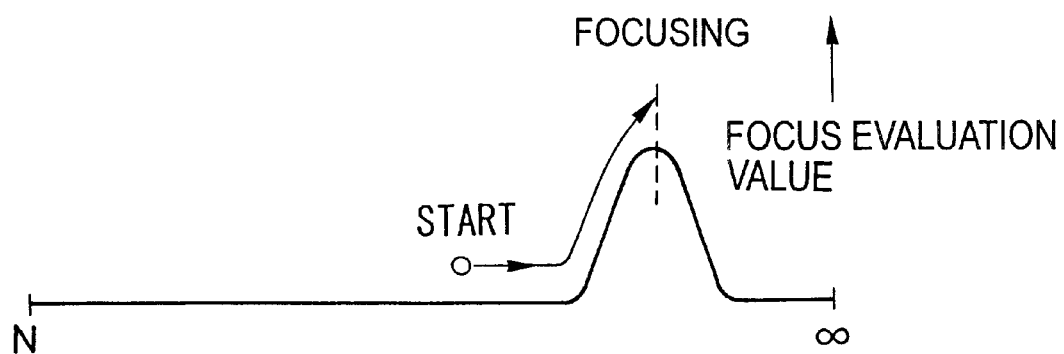

LENS APPARATUS

BACKGROUND OF THE INVENTION

1. Field of the Invention

The present invention relates to a lens apparatus, and more particularly, to a lens apparatus provided with an autofocus function.

2. Description of the Related Art

In a lens apparatus used in a television camera or the like, autofocus is known which automatically moves a focus lens to a focusing position according to a high frequency component of an image signal obtained from the television camera. Japanese Patent Application Publication No. 1-158881 discloses a focus adjustment method, in which the operator carries out focus adjustment by manual focus, and then focus adjustment with high accuracy difficult to be visually performed is subsidiary carried out by the autofocus.

However, the above focus adjustment method is basically carried out by the manual focus, requires that the operator carries out focus adjustment visually through a viewfinder until focusing to some extent is obtained, and does not reduce burdens of the operator in the focus adjustment.

On the other hand, in the case of the autofocus that the whole focus adjustment is automatically carried out (which is referred to as autofocus mode), the focus adjustment imposes no burden on the operator. However, the autofocus cannot sometimes determine in which of an infinite or close-up direction a focus is deviated which can be empirically easily determined by the operator. In such a case, in a conventional autofocus, for example, the focus lens is moved to a predetermined direction to detect a focusing position in that direction, and if the focusing position is not detected in that direction, the moving direction is reversed after the focus lens reaches an end to detect the focusing position in the reverse direction. Thus, focusing sometimes requires a long time.

SUMMARY OF THE INVENTION

For this reason, as a new autofocus mode, it is considered that in which of an infinite or close-up direction a focus is deviated is determined by an operator, that the operator is only required to demand an autofocus start-up direction, and then that focusing can be rapidly carried out without focus adjustment imposing burdens on the operator.

In achieving such an autofocus mode, it is required to allow the operator to properly demand the autofocus start-up direction and allow the demand to be appropriately determined.

Further, in the autofocus mode, it is considered that the autofocus start-up direction is demanded by the operator by operating a focus operation member used in manual focus, permitting rapid focusing without imposing burdens of focus adjustment on the operator. In this case, switching to the autofocus is automatically carried out from a state where the operator operates the focus operation member demanding the autofocus start-up direction, and on which condition the switching to the autofocus is carried out is important in terms of rapid focusing and operability. In the case where an operation force of the focus operation member (operation torque when the focus operation member is a focus ring) is changed in switching to the autofocus, it is necessary to prevent rapid change of the operation force so as not to give the operator uncomfortable feeling.

Further, in such an autofocus mode, it is considered that there are various aspects of processings after focusing is once completed, and that a preferable processing is different depending on the operator's preference or a situation.

An object of the present invention is to provide a lens apparatus capable of rapid focusing by autofocus.

Another object of the present invention is to provide a lends apparatus capable of appropriately determining a demand of an autofocus start-up direction which is properly provided by an operator in an autofocus mode where the operator demands the autofocus start-up direction.

Still another object of the present invention is to provide a lens apparatus wherein, in automatically switching to autofocus from a state where an operator operates a focus operation member, a preferable switching condition is selected in terms of rapid focusing and operability, eliminating uncomfortable operation feeling of the focus operation member in switching to the autofocus.

Yet another object of the present invention is to provide a lens apparatus which allows an operator to select an aspect of a processing after completion of focusing to thereby achieve improvement of convenience of an autofocus mode in the autofocus mode where an operator demands an autofocus start-up direction.

According to the present invention, when the operator demands a moving direction of a focus lens, the focus lens is started to be moved in that direction and set to the focusing position existing in the direction, so that focusing can be rapidly carried out in the autofocus if the operator appropriately demands the moving direction. Further, the operator needs only to demand the moving direction of the focus lens, thereby reducing burdens in the focus adjustment.

According to the present invention, when a start of an autofocus mode is instructed, an AF standby state of waiting for the operator to demand the moving direction of the focus lens, that is, an autofocus start-up direction by operating a focus operation member used in manual focus is set, so that an operator can demand the autofocus start-up direction with the same feeling as the manual focus. Also, by recognizing the operation of the focus operation member in the AF standby state as the demand of the autofocus start-up direction, the demand can be appropriately determined.

A function of a quick zoom is generally used when a desired subject is to be zoomed and focused with high accuracy, and automatically switching to the autofocus mode in an interlocked manner with the start of the quick zoom can save trouble of the operation for starting the autofocus mode by the operator.

According to the present invention, when automatically switching from the state where the operator operates the focus operation member to the autofocus, condition of the switching is that a focus evaluation value exceeds a predetermined threshold, so that the autofocus can be started at a level of the focus evaluation value where no malfunction of the autofocus occurs, permitting rapid focusing.

Further, the condition of switching to the autofocus is that a moving amount of the focus lens which moves according to the operation of the focus operation member, or an operation amount of the focus operation member changes more than a predetermined amount, so that a dead zone can be provided on the focus operation member, preventing defects such as a start of the autofocus by a slight motion of the focus operation member unintended by the operator to improve operability.

Further, gradually switching a clutch, which switches focus lens driving from manual to electrical operation, from a manual to electrical state can eliminates a defect of rapid change of the operation force of the focus operation member for manually driving the focus lens by switching to the autofocus, and uncomfortable operation feeling of the focus operation member in switching to the autofocus.

According to the present invention, for a processing after completion of focusing in the autofocus mode where the operator demands the autofocus start-up direction, at least two mode can be selected among a mode of returning to the AF standby state of waiting for the operator to demand the AF start-up direction, mode of automatically finishing the autofocus mode, and mode of moving the focus lens according to an image signal from a camera in such a manner that the focus lens is always in a focusing position, which permits selecting a preferable mode depending on the operator's preference or the situation, and achieving improvement of convenience of the autofocus mode.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 shows an appearance of an example of a lens apparatus (ENG lens) for a television camera to which the present invention is applied;

FIG. 3 is an explanatory diagram used for explaining an AF mode in an embodiment of the present invention;

FIG. 4 is an explanatory diagram used for explaining an AF mode in an embodiment of the present invention;

DETAILED DESCRIPTION OF THE PREFERRED EMBODIMENTS

Figure 2:
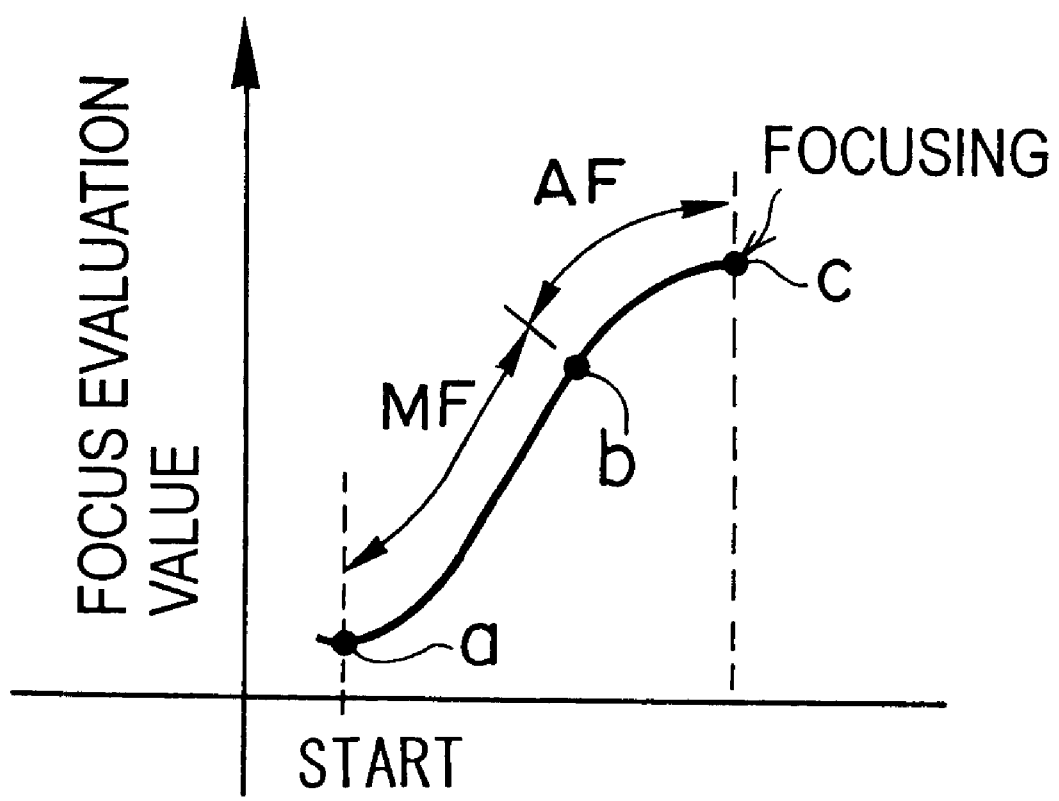
FIG. 2 is an explanatory diagram used for explaining an outline of an AF mode in an embodiment of the present invention.

Preferred embodiments of a lens apparatus according to the present invention will be described below with reference to the drawings.

FIG. 1 shows an appearance of an example of a lens apparatus (ENG lens) for a television camera to which the present invention is applied. The lens apparatus 1 shown in FIG. 1 is an inner focus type zoom lens used in a television camera for broadcasting such as an ENG camera, and a lens barrel 2 is provided with operation rings such as a focus ring FR, zoom ring ZR and iris ring AR. The unshown inside of the lens barrel 2 is provided with, as known, optical members such as a focus lens (group) movable in an optical axis direction for focusing, zoom lens (group) movable in an optical axis direction for scaling, iris, relay lens (group) in order from the front. Rotation of the focus ring FR causes the focus lens to be moved in the optical axis direction, rotation of the zoom ring ZR causes the zoom lens to be moved in the optical axis direction, and rotation of the iris ring AR causes a diameter of an iris diaphragm to be changed.

On the side of the lens barrel 2 is located a drive unit 12 for electrically driving the focus ring FR, zoom ring ZR and iris ring AR. The drive unit 12 has a casing 14, which is mounted to the side of the lens barrel 2 via screws 16, 16. Disposed in the casing 14 are an unshown focus driving motor, zoom driving motor and iris driving motor, which are respectively coupled to the focus ring FR, zoom ring ZR and iris ring AR via unshown respective power transmission mechanisms. Therefore, rotation of the focus driving motor causes the focus ring FR to be rotated, rotation of the zoom driving motor causes the zoom ring ZR to be rotated, and rotation of the iris driving motor causes the iris ring AR to be rotated.

Each of the driving motors is controlled according to operations of various operation members provided in the drive unit 12 or signals from a camera body or an external controller (such as focus demand and zoom demand) connectable to the drive unit 12. Also provided is a zoom seesaw switch 18 for an operator (hereinafter referred to as an operator) to electrically carry out a zoom operation.

As mentioned below, the power transmission mechanism of each of the focus driving motor and focus ring FR, zoom driving motor and zoom ring ZR, and iris driving motor and iris ring AR is adapted to be connected or disconnected by a clutch. The operation ring in a state where the clutch is turned off and the power transmission mechanism is disconnected can be operated by a hand gripping the operation ring, and the operation ring in a state where the clutch is on and the power transmission mechanism is connected can be electrically operated by the driving motor. On/off of each clutch can be appropriately switched with an electrical control by a predetermined switch or the like.

In the above described lens apparatus 1, focus adjustment can be carried out mainly by manual focus (MF) in an "MF mode" and autofocus (AF) in an "AF mode". The "MF" mode is a mode where the operator operates a predetermined focus operation member to thereby carry out focus adjustment, and includes a mode of manually driving a focus lens (hereinafter, driving of the focus lens is referred to as focus driving) and a mode of electrically carrying out the focus driving. Hereinafter, the mode of manually carrying out the focus driving is referred to as a "manual MF mode", and the mode of electrically carrying out the focus driving is referred to as an "electrical MF mode".

In the "manual MF mode", the focus adjustment can be carried out by directly rotationally operating the focus ring FR by a hand gripping the focus ring FR, while in the "electrical MF mode", the focus adjustment can be carried out in such a manner that a focus operation member for electrical use (electrical operation member) is operated to thereby drive the focus driving motor and to move the focus lens by the driving force. Corresponding to the electrical operation member is, for example, an operation member of the external controller such as the focus demand connected to the drive unit 12, but not limited to this. The focus operation members operated in the manual MF mode and electrical MF mode are collectively referred to as MF operation members, and their operations are referred to as MF operations.

On the other hand, the AF in the AF mode is the one generally known in the past, and the focus adjustment thereby is carried out in such a manner that focus driving is electrically carried out, that a high frequency component in a focus area (for example in the center of a screen) is extracted from an image signal of an image taken by a television camera to obtain a focus evaluation value (mentioned below), and that a focusing position is detected according to the focus evaluation value to thereby automatically set the focus lens in the focusing position. However, the AF mode described in this embodiment is different from a conventional fully automated AF mode. In the conventional AF mode, a start-up direction of a focus lens for the AF (hereinafter referred to as an AF start-up direction) is automatically determined by, for example, an increasing tendency of a focus evaluation value to cause the focus lens to start movement in that direction, while in the AF mode in this embodiment, the operator demands the AF start-up direction by, for example, the MF operation to thereby cause the focus lens to start movement in that direction and to set the focus lens in the focusing position in that direction according to the focus evaluation value. Such demand of the AF start-up direction by the operator permits rapid and reliable focusing.

Such an AF mode and the conventional AF mode fully automated including the AF start-up direction may be adapted to be switchable, but for convenience in description, it is assumed that only the AF mode where the operator demands the AF start-up direction is set in this embodiment.

An outline of the AF mode of this embodiment will be described according to operation steps by the operator with reference to FIG. 2. First, assuming that the mode is set to the manual MF mode, the clutch between the focus driving motor and focus ring FR is turned off to raise a state where the operator can manually rotationally operate the focus ring FR to manually carry out the focus driving. The state of the clutch where the focus driving can be manually carried out is referred to as a state of the clutch set to a manual side, and the state of the clutch where the focus driving can be electrically carried out is referred to as a state of the clutch set to an electrical side. At this time, the operator presses a predetermined AF mode starting switch (mentioned below) to switch the mode to the AF mode (a start point a in FIG. 2) and to first raise an AF standby state. In the AF standby state, the clutch is held set to the manual side.

Next, the operator manually rotates the focus ring FR in an infinite direction or a close-up direction to demand the AF start-up direction. This operation causes the clutch to be turned on and switched to the electrical side setting. While the operator demands the AF start-up direction by the focus ring FR (in an interval between points a to b in FIG. 2), the focus lens is moved by operating the focus ring FR.

When the clutch is switched to the electrical side setting, driving of the focus driving motor is started, and the focus ring FR is rotated in the AF start-up direction demanded by the operator to cause the focus lens to start movement in the AF start-up direction. When a focusing position (point c in FIG. 2) in that direction is detected by an AF processing, driving of the focus driving motor is stopped, and the focus lens is set to the focusing position.

The demand of the AF start-up direction may be carried out by operating an electrical operation member such as the focus demand or the like. The AF start-up direction may be adapted to be demanded with a dedicated demand switch. Further, a demand of the AF startup direction by the dedicated demand switch without switching to the AF mode by the AF mode starting switch may cause the mode to be switched from the MF mode to AF mode, and cause the focus lens to be moved in the demanded direction to start the AF processing.

By such an AF mode, the AF start-up direction can be determined in an appropriate direction by the operator's empirical determination, permitting rapid and reliable focusing on a desired subject. That is, in the AF mode fully automated as in the conventional case, when the AF is started from a position where a level of the focus evaluation value based on the high frequency component of the image signal is substantially constant as shown in FIG. 3, there is a high possibility of starting movement of the focus lens in a direction opposite the focusing position with the largest (maximum) focus evaluation value, and in this case, an AF movement is such as to once move to an end (a close-up end in the figure) and then return to stop at the focusing position. Thus, there is a possibility of losing a long time for focusing. On the contrary, in the AF mode of this embodiment, the operator can empirically appropriately demand the AF start-up direction to thereby start movement of the focus lens in the direction of the focusing position as shown in FIG. 4, thereby permitting rapid focusing. Even when there are a plurality of focusing positions and the focus lens is once set to any one of the focusing positions, raising the AF standby state again to demand the AF start-up direction allows the focus lens to be reset at another desired focusing position.

Figure 5:
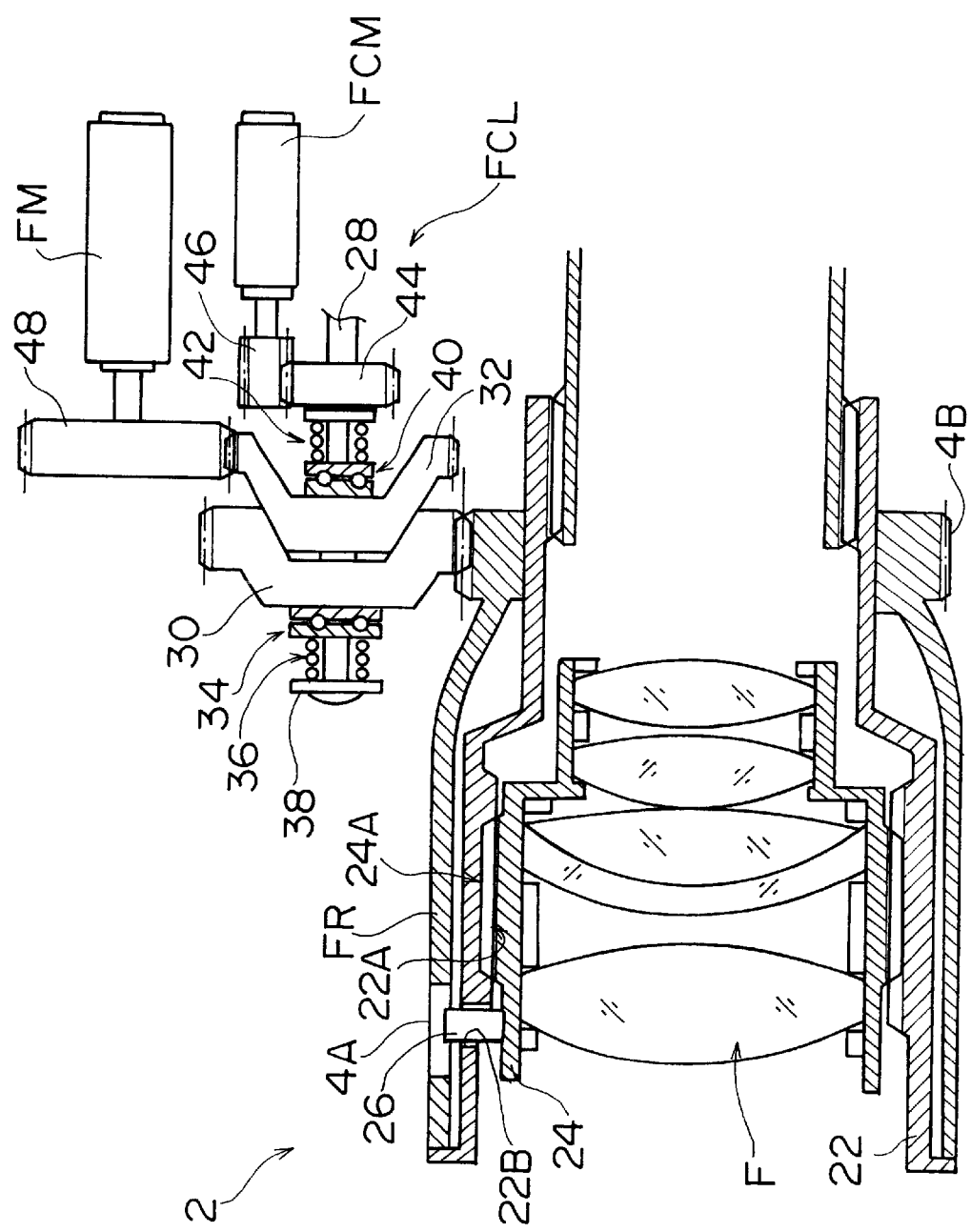
FIG. 5 is a side sectional view of a basic configuration of a focus driving mechanism (first embodiment)

Next, a focus driving mechanism capable of switching the focus driving between the manual operation and electrical operation in the lens apparatus 1 as described above will be described. Since the zoom driving mechanism and iris driving mechanism are configured similarly to the focus driving mechanism, description will be made on the focus driving mechanism only. FIG. 5 is a side sectional view of a basic configuration of a focus driving mechanism (first embodiment). As shown in FIG. 5, focus lenses (group) F constituted by a plurality of lenses are disposed in a barrel body 22 of the lens barrel 2, and the above described focus ring FR is rotatably disposed on an outer periphery of the barrel body 22. A rear part of the focus lens F (the right in the figure) is provided with an unshown zoom lens (group), iris, relay lens (group), or the like in order. The focus lens F is held by a lens holding frame 24, which is rotatably held in the barrel body 22 by engagement between helicoids 24A, 22A respectively formed on an outer peripheral surface of the lens holding frame 24 and the inner peripheral surface of the barrel body 22. On the other hand, a pin 26 is fixed to the lens holding frame 24 and inserted into an inserting hole 22B formed in the barrel body 22 to be engaged with a linear groove 4A in the optical axis direction formed on the focus ring FR. Therefore, rotation of the focus ring FR causes the lens holding frame 24 to be rotated via the pin 26 in the barrel body 22. The lens holding frame 24 is rotated to be then moved back and forth in the optical axis direction in the barrel body 22 by the action of the helicoids 22A, 24A, and causes the focus lens F to be moved in the optical axis direction. Thus, focus adjustment is carried out. The inserting hole 22B formed in the barrel body 22 is shaped along a moving track of the pin 26 which moves back and forth in the optical axis direction while rotating around the optical axis.

A focus driving motor FM, clutch motor FCM, clutch (mechanism) FCL shown in FIG. 5 are provided in the casing 14 of the drive unit 12, and the focus driving motor FM is coupled to the focus ring FR via the clutch FCL. On/off of the clutch FCL is switched by the clutch motor FCM. The focus driving motor FM and clutch motor FCM are respectively fixed to the casing 14 of the drive unit 12 or the barrel body 22.

The clutch FCL comprises a shaft 28 fixed to the casing 14 of the drive unit 12 or the barrel body 22, and a pair of clutch plates 30, 32 are rotatably provided on the shaft 28. These clutch plates 30, 32 are respectively formed at their opposed surfaces into a recess and projection having conical surfaces, and when the clutch plate 32 is pressed by the clutch plate 30, the conical surfaces are pressed against each other to produce friction, and when one of the clutch plates 30, 32 is rotated, the other clutch plate is rotated in an interlocked manner therewith. In the left of the clutch plate 30 in the figure are provided a bearing (thrust bearing) 34 and spring 36, and to a tip of the shaft 28 is fixed a securing member 38 which regulates a left end of the spring 36. The clutch plate 30 is energized rightward in the figure by an energizing force of the spring 36. On the other hand, the right surface of the clutch plate 30 in the figure abuts against a step of the shaft 28 or a regulating member (not shown) fixed to the shaft 28, so that the clutch plate 30 is rotatably disposed on a certain position on the shaft 28.

On the right of the clutch plate 32 in the figure are provided a bearing (thrust bearing) 40 and spring 42 together with a rotating member secured by a screw to a screw portion formed on part of the shaft 28. The clutch plate 32, bearing 40, spring 42 and rotary member 44 are mutually fixed at their respective abutting portions, and when the rotary member 44 is rotated to be moved laterally in the figure on the shaft 28, the clutch plate 32 is moved laterally in the figure on the shaft 28 in an interlocked manner therewith.

Further, a peripheral surface of the rotary member 44 is formed with a gear, with which a gear 46 meshes which is fixed to an output shaft of the clutch motor FCM. Thus, driving the clutch motor FCM causes the rotary member 44 to be rotated and moved laterally in the figure on the shaft 28. The clutch motor FCM causes the rotary member 44 to be moved leftward in the figure, and after the clutch plate 32 abutting against the clutch plate 30, the rotary member 44 is further moved leftward in the figure, then the spring 42 is compressed to produce an energizing force for energizing the clutch plate 32 leftward in the figure, and the clutch plate 32 is pressed against the clutch plate 30 by the energizing force. In this state, the clutch FCL is turned on, and the clutch plate 30 and clutch plate 32 rotate in an interlocked manner. That is, the clutch FCL enters a state of transmitting power. On the other hand, when the rotary member 44 is moved rightward in the figure from a state where the clutch FCL is on, the energizing force leftward in the figure by the spring 42 is released, and then the clutch plate 32 is moved rightward in the figure apart from the clutch plate 30. In this state, the clutch FCL is turned off, and the clutch plate 30 and clutch plate 32 stop rotating in the interlocked manner. That is, the clutch FCL enters a state of not transmitting the power.

A peripheral surface of the clutch plate 32 is formed with a gear, with which a gear 48 meshes which is fixed to an output shaft of the focus driving motor FM. A peripheral surface of another clutch plate 30 is also formed with a gear, with which a gear 4B meshes which is formed on a peripheral surface of the focus ring FR. Therefore, when the focus driving motor FM is driven in the state where the clutch FCL is on as described above, rotation of the output shaft is transmitted to the focus ring FR via the clutch plates 32, 30 to rotate the focus ring FR. That is, the electrical focus driving can be carried out. When the clutch FCL is off, the focus driving motor FM and focus ring FR enter the state of not transmitting the power, so that the electrical focus driving cannot be carried out, while the focus ring FR can be rotationally operated directly by hand. That is, the manual focus driving can be carried out.

As effects of the focus driving mechanism configured as described above, an example of the case where the mode is switched from the manual MF mode to AF mode will be described. In the manual MF mode, the clutch FCL is off (the state where the clutch FCL is set to the manual side), and the operator can rotationally operate the focus ring FR directly by hand. At this time, the AF mode starting switch is turned on by the operator to switch the mode to the AF mode and to provide the AF standby state with the clutch FCL set to the manual side. In the AF standby state, rotational operation of the focus ring FR in the AF start-up direction as intended by the operator causes the focus lens F to be moved in an interlocked manner therewith. Then, a change of a focus position is detected by an unshown focus position detecting device, and the AF start-up direction demanded by the operator is determined from the change. The focus position detecting device may be, for example, a device which detects the focus position by an output signal of a potentiometer engaged with the gear 4B of the focus ring FR or the gear on the peripheral surface of the clutch plate 30, or a device which detects the focus position by other methods. Alternatively, instead of determining the AF start-up direction by the focus position detecting device, the AF start-up direction may be determined by, for example, directly detecting the rotation of the focus ring FR with the potentiometer.

When the AF start-up direction is determined by the focus position detecting device, the clutch motor FCM is driven to switch the clutch FCL from off (manual side) to on (electrical side), and then the focus driving motor FM is driven to electrically rotate the focus ring FR in the AF start-up direction. This causes the focus lens F to be moved in the AF start-up direction demanded by the operator, and when the focusing position is detected by the AF processing, driving of the focus driving motor FM is stopped and the focus lens F is set to the focusing position.

Figure 6:
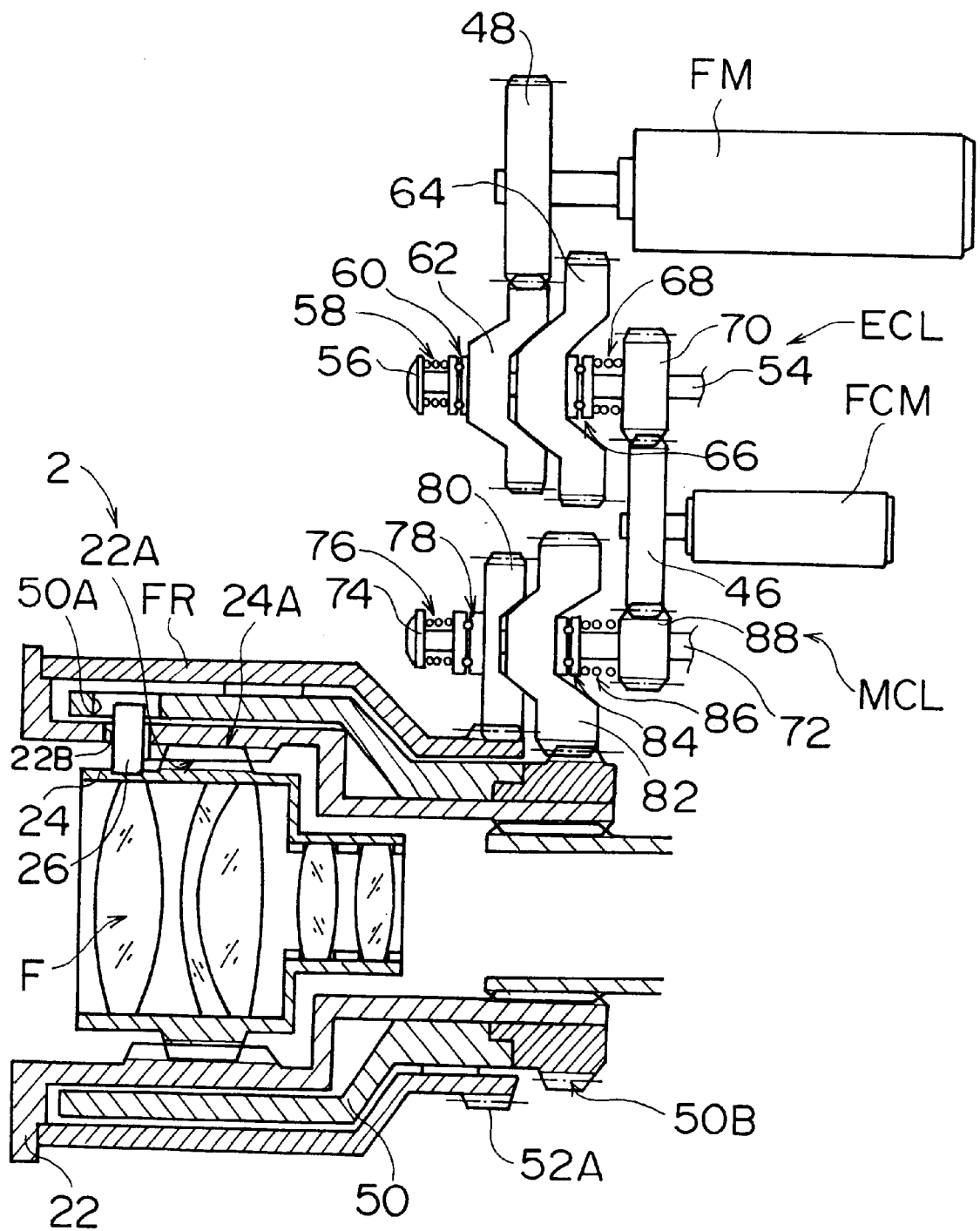
FIG. 6 is a side sectional view of a configuration of a focus driving mechanism of a second embodiment and shows part of component members in a developed manner.

Next, a focus driving mechanism of a second embodiment will be described. FIG. 6 is a side sectional view of a configuration of the focus driving mechanism and shows part of component members disposed on a peripheral surface of a lens barrel 2 in a developed manner. The members identical to or having similar effects to the members in FIG. 5 are designated by the same reference numerals and characters as in FIG. 5.

As shown in FIG. 6, focus lenses (group) F constituted by a plurality of lenses are disposed in a barrel body 22 of the lens barrel 2, and a driving ring 50 is rotatably disposed on an outer periphery of the barrel body 22. A focus lens F is held by a lens holding frame 24, which is rotatably held in the barrel body 22 by engagement between helicoids 24A, 22A respectively formed on an outer peripheral surface of the lens holding frame 24 and the inner peripheral surface of the barrel body 22. On the other hand, a pin 26 is fixed to the lens holding frame 24 and inserted into an inserting hole 22B formed in the barrel body 22 to be engaged with a linear groove 50A in an optical axis direction formed on the driving ring 50. Therefore, rotation of the driving ring 50 causes the lens holding frame 24 to be rotated via the pin 26 in the barrel body 22. The lens holding frame 24 is rotated to be then moved back and forth in the optical axis direction in the barrel body 22 by the action of the helicoids 22A, 24A, and causes the focus lens F to be moved in the optical axis direction. Thus, focus adjustment is carried out.

A periphery of the driving ring 50 is rotatably provided with an operation ring (referred to as a focus ring FR) corresponding to the focus ring FR in FIG. 1. This focus ring FR is a manual focus operation member rotationally operated by a hand of the operator gripping the same, and is also used as an operation member for demanding an AF start-up direction in an AF standby state of the AF mode described above.

Figure 7:
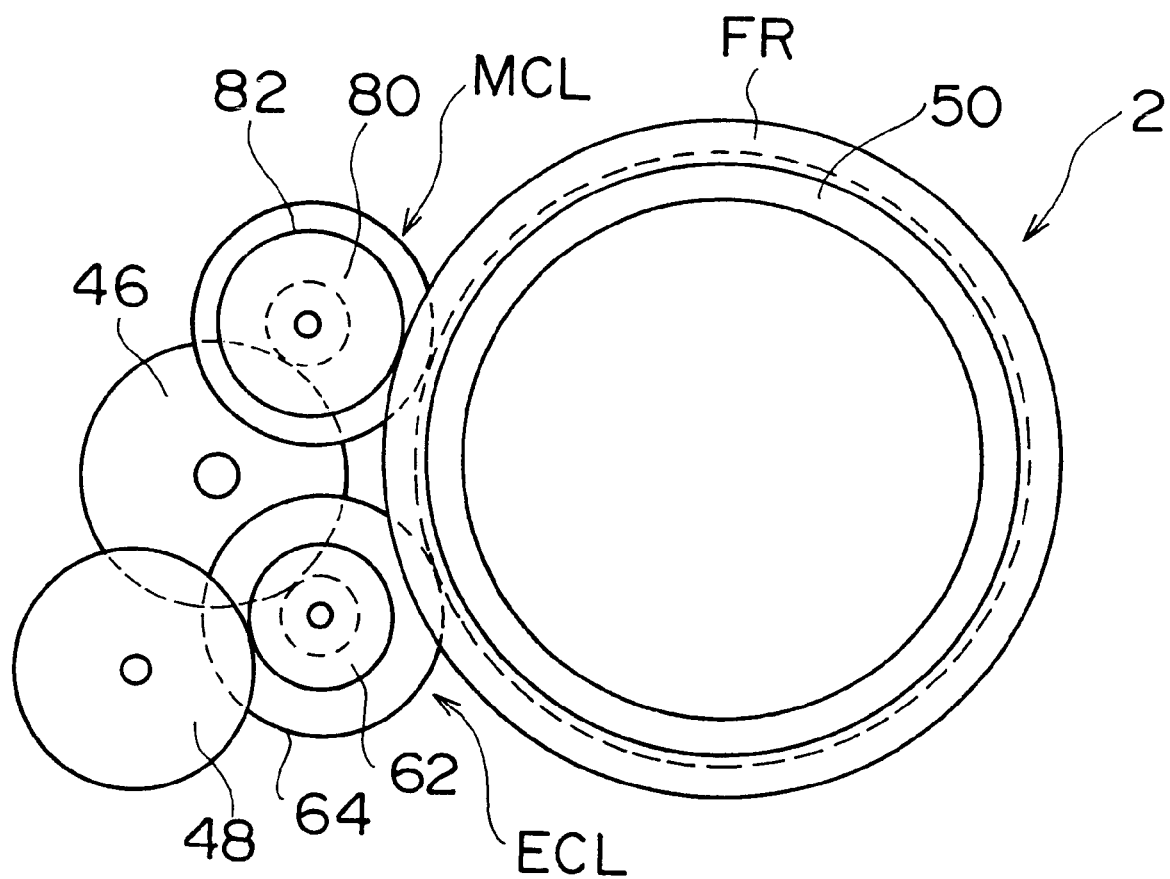
FIG. 7 is a front view of the configuration of the focus driving mechanism of the second embodiment.

A focus driving motor FM, clutch motor FCM, electrical clutch ECL and manual clutch MCL shown in FIG. 6 are those disposed on the periphery of the lens barrel 2 shown in a developed manner as shown in a front view of FIG. 7. These members are provided in a casing 14 of a drive unit 12. The focus driving motor FM is coupled to a driving ring 50 via the electrical clutch ECL, and the focus ring FR is coupled to the driving ring 50 via the manual clutch MCL. On/off of the electrical clutch ECL and manual clutch MCL are switched by one clutch motor FCM. The focus driving motor FM and clutch motor FCM are respectively fixed to the casing 14 of the 12 or the barrel body 22.

The electrical clutch ECL is a clutch for connecting or disconnecting power transmission between the focus driving motor FM and driving ring 50, while the manual clutch MCL is a clutch for connecting or disconnecting power transmission between the focus ring FR and driving ring 50. Basic configurations of both of the electrical clutch ECL and manual clutch MCL are the same as in the clutch FCL shown in FIG. 5 and detailed description thereof will be omitted. The electrical clutch ECL comprises a shaft 54 fixed to the casing 14 of the drive unit 12 or the barrel body 22, and on the shaft 54, a securing member 56, spring 58, bearing 60, a pair of clutch plates 62, 64, bearing 66, spring 68 and rotary member 70 are disposed in order from the left in the figure. A peripheral surface of the rotary member 70 is formed with a gear, with which a gear 46 meshes which is fixed to an output shaft of the clutch motor FCM, and the electrical clutch ECL is turned on/off by the clutch motor FCM. A gear formed on a peripheral surface of one clutch plate 62 is arranged to mesh with a gear 48 fixed to the output shaft of the focus driving motor FM, and a gear formed on a peripheral surface of the other clutch plate 64 is arranged to mesh with a gear 50B formed on the peripheral surface of the driving ring 50. Therefore, in the state where the manual clutch MCL is on, driving the focus driving motor FR causes the driving ring 50 to be rotated and causes the focus lens F to be moved as described above.

The manual clutch MCL comprises a shaft 72 fixed to the casing 14 of the drive unit 12 or the barrel body 22, and on the shaft 72, a securing member 74, spring 76, bearing 78, a pair of clutch plates 80, 82, bearing 84, spring 86 and rotary member 88 are disposed in order from the left in the figure. A peripheral surface of the rotary member 88 is formed with a gear, with which a gear 46 meshes which is fixed to an output shaft of the clutch motor FCM, and the manual clutch MCL is turned on/off by the clutch motor FCM. A gear formed on a peripheral surface of one clutch plate 80 is arranged to mesh with a gear 52A formed on the peripheral surface of the focus ring FR, and a gear formed on a peripheral surface of the other clutch plate 82 is arranged to mesh with a gear 50B formed on the peripheral surface of the driving ring 50. Therefore, in the state where the manual clutch MCL is on, rotational operation of the focus driving motor FR causes the driving ring 50 to be rotated and causes the focus lens F to be moved as described above.

Figure 8:
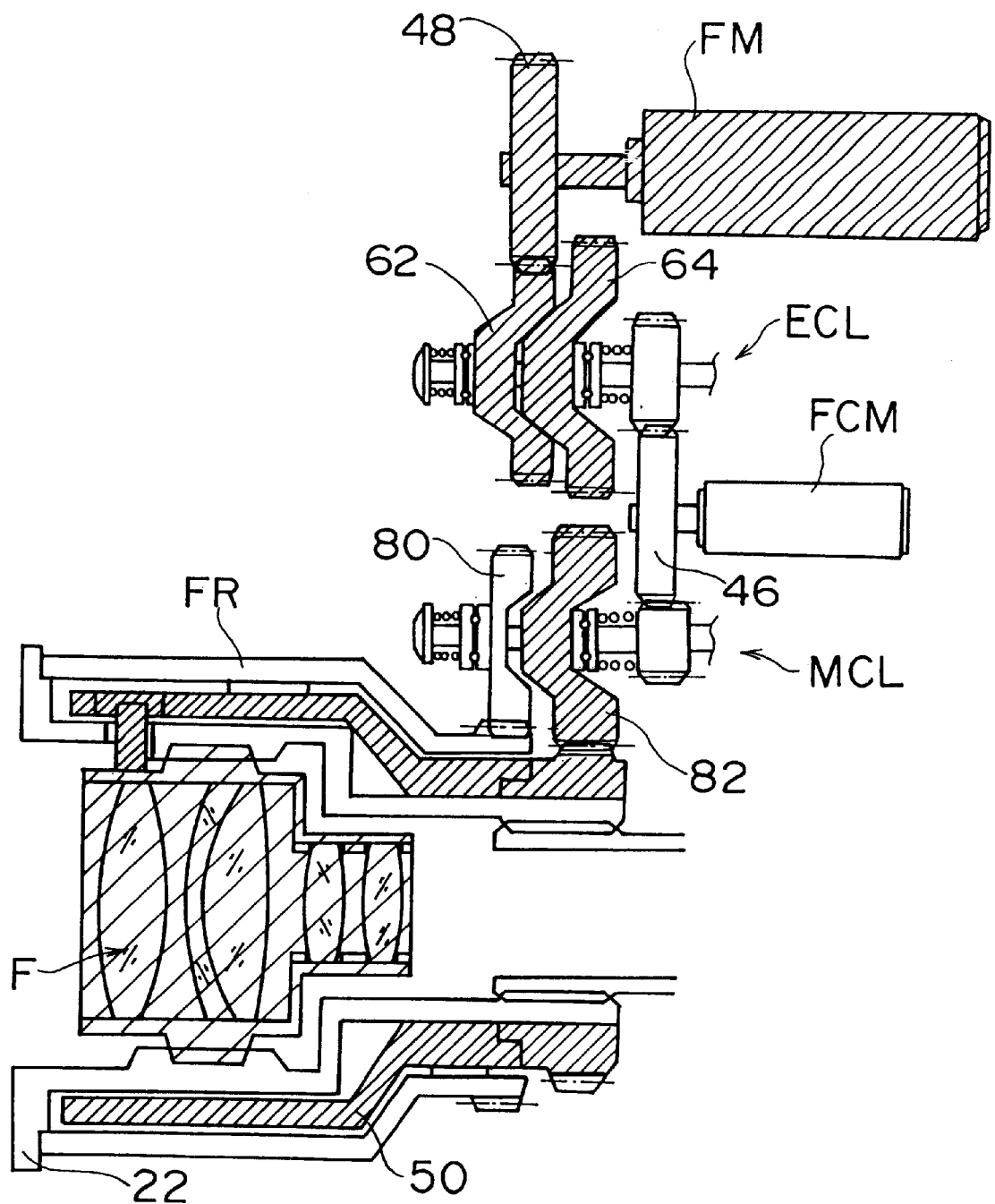
FIG. 8 is a side sectional view of a state in electrical focus driving in the focus driving mechanism of the second embodiment.

The above described electrical clutch ECL and manual clutch MCL are in a relationship such that one is turned on and then the other is turned off by the clutch motor FCM. When carrying out electrical focus driving, the clutch plates 62, 64 are pressed against each other as shown in FIG. 8, and the electrical clutch ECL is turned on, that is, enters a state where power is transmitted from the focus driving motor FM to driving ring 50, while the clutch plates 80, 82 are spaced apart from each other, and the manual clutch MCL is turned off, that is, enters a state where the power is not transmitted from the focus ring FR to driving ring 50, or vice versa. Thus, in this state, as shown by hatching members to be driven by the focus driving motor FM in FIG. 8, when the focus driving motor FM is driven, the power is transmitted to the driving ring 50 via the clutch plates 62, 64 of the electrical clutch ECL to rotate the driving ring 50, and the rotation of the driving ring 50 causes the focus lens F to be moved. The power is, however, not transmitted to the focus ring FR via the manual clutch MCL, and the focus ring FR is stopped. The rotational operation of the focus ring FR does not transmit the power to the driving ring 50 via the manual clutch MCL nor cause the focus lens F to be moved. When the driving ring 50 is rotated by friction between the focus ring FR and the peripheral surface of the driving ring 50, the focus ring FR undergoes the driving force, and, for example, a corrugated plate spring is provided in a space between a tip of the focus ring FR and the barrel body 22, and the rotation of the focus ring FR is regulated by the friction between the corrugated spring and focus ring FR. However, as long as the manual clutch MCL is turned off at the time of electrical focus driving, problems do not necessarily occur even if the focus ring FR is rotated by the driving force directly transmitted from the driving ring 50.

Figure 9:
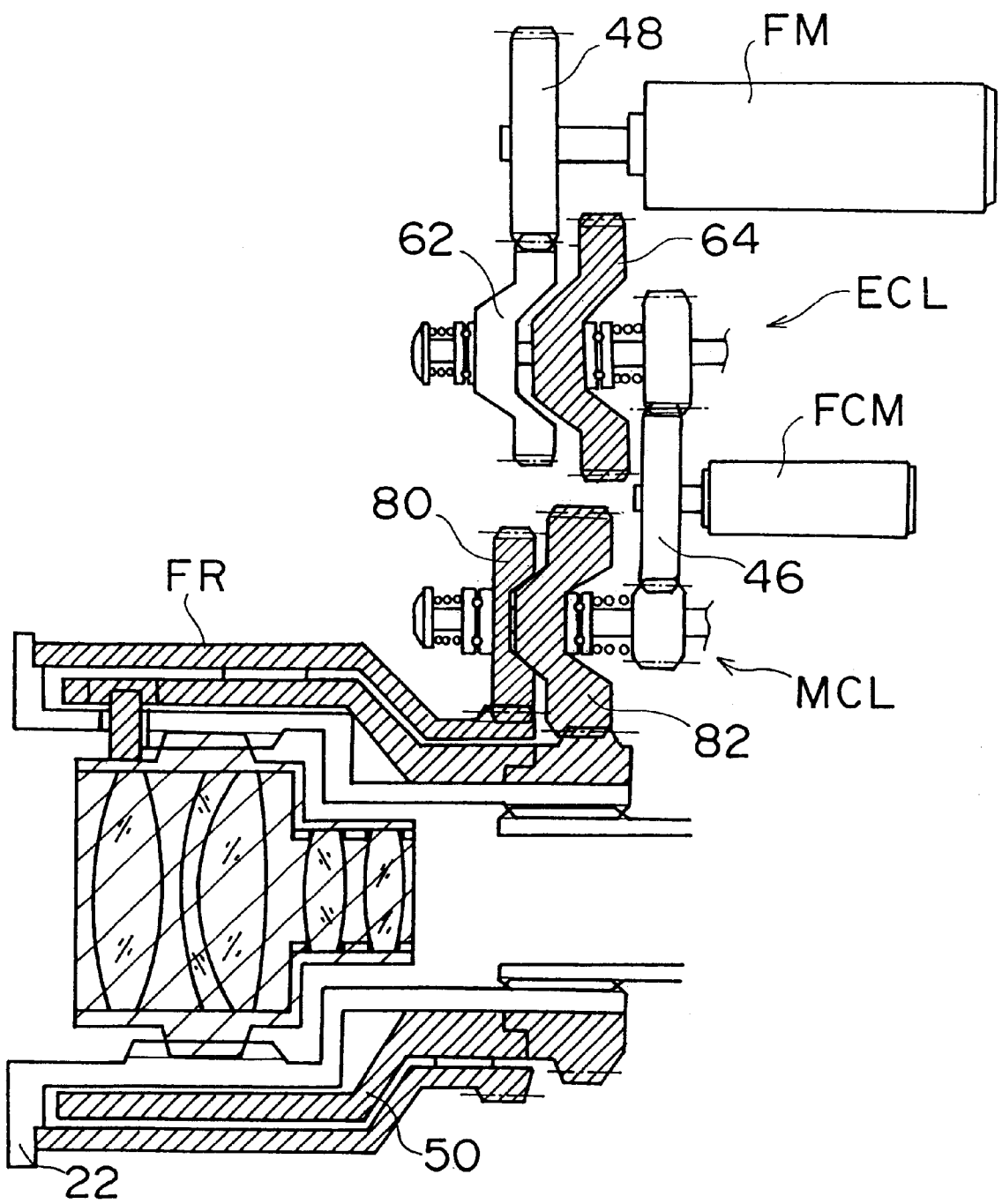
FIG. 9 is a side sectional view of a state in manual focus driving in the focus driving mechanism of the second embodiment.

When carrying out manual focus driving, the clutch plates 80, 82 of the manual clutch MCL are pressed against each other as shown in FIG. 9, and the manual clutch MCL is turned on, that is, enters a state where the power is transmitted from the focus ring FR to the driving ring 50, while the clutch plates 62, 64 are spaced apart from each other, and the electrical clutch ECL is turned off, that is, enters a state where the power is not transmitted from the focus driving motor FM to driving ring 50 or vise versa. Thus, in this condition, as shown by hatching members to be driven by the rotation of the focus ring FR in FIG. 9, when the operator rotationally operates the focus ring FR, the power is transmitted to the driving ring 50 via the clutch plates 80, 82 of the manual clutch MCL to rotate the driving ring 50, and the rotation of the driving ring 50 causes the focus lens F to be moved. The power is, however, not transmitted to the focus driving motor FM via the electrical clutch ECL, and the focus ring FR can be easily rotationally operated. Driving of the focus driving motor FM does not transmit the power to the driving ring 50 via the electrical clutch ECL nor cause the focus lens F to be moved.

Figure 10:
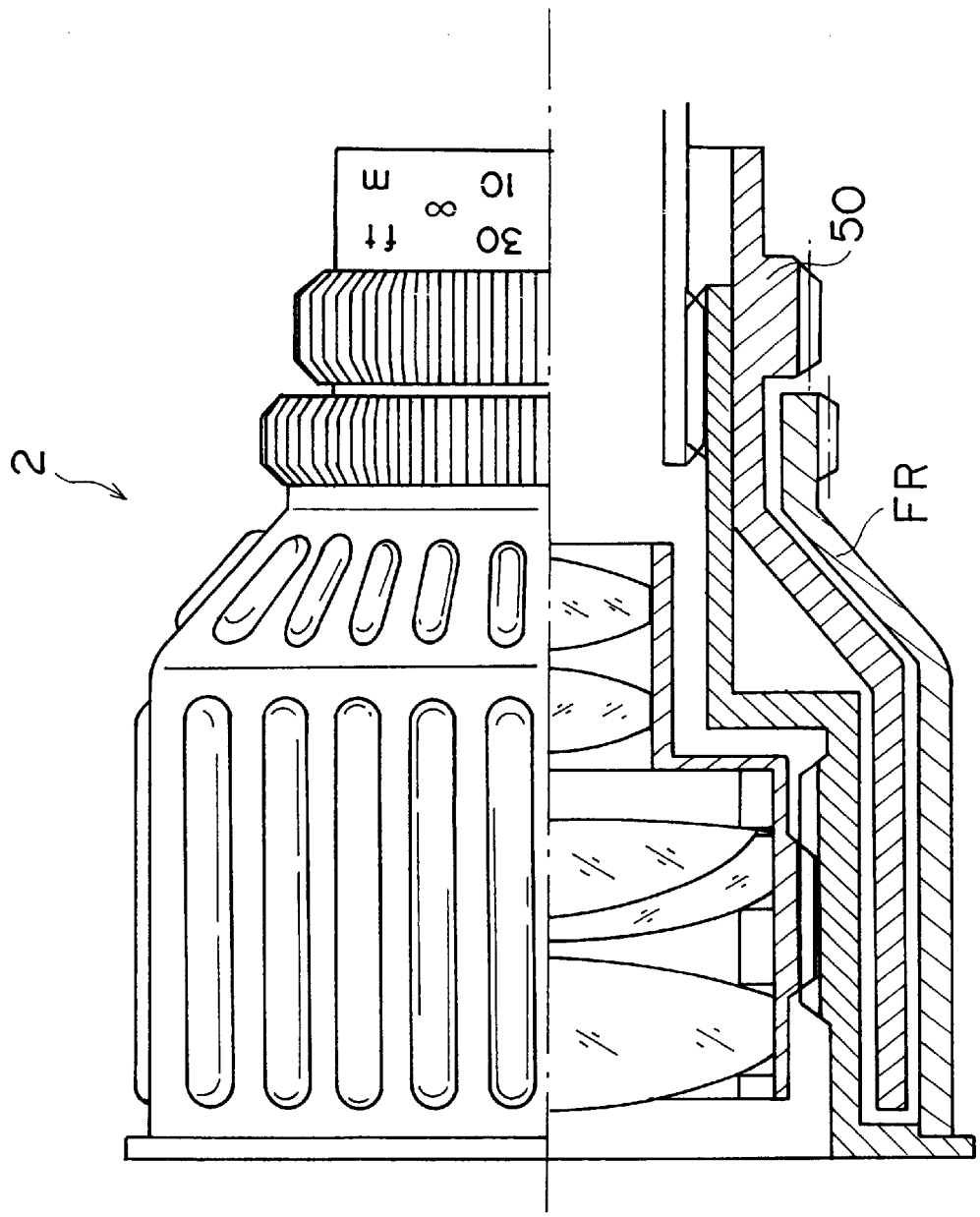
FIG. 10 shows an example of providing demands showing focus positions on a driving ring.

The focus ring FR is generally provided with a demand showing a focus position, but in the case where the focus ring FR is not rotated when carrying out electrical focus driving as the focus driving mechanism in this embodiment, it is not preferable to provide the demand showing the focus position on the focus ring FR. Thus, in the present invention, the demand showing the focus position is provided on the driving ring 50 as shown in FIG. 10 in view of the fact that the driving ring 50 is rotated having a certain relationship with the position of the focus lens F in both of the manual and electrical focus driving.

As effects of the focus driving mechanism configured as described above, an example of the case where the mode is switched from the manual MF mode to AF mode will be described. In the manual MF mode, the manual clutch MCL is on and the electrical clutch ECL is off (the state where the manual clutch MCL and electrical clutch ECL are set to the manual side), and the operator can rotationally operates the focus ring FR directly by hand. At this time, the AF mode starting switch is turned on by the operator to switch the mode to the AF mode and to provide the AF standby state with the manual clutch MCL and electrical clutch ECL set to the manual side. In the AF standby state, rotational operation of the focus ring FR in the AF start-up direction as intended by the operator causes the focus lens F to be moved in an interlocked manner therewith. Then, a change of a focus position is detected by an unshown focus position detecting device, and the AF start-up direction demanded by the operator is determined from the change. The focus position detecting device may be, for example, a device which detects the focus position by an output signal of a potentiometer engaged with the gear 50B of the driving ring 50, the gear on the peripheral surface of the clutch plate 64 or the gear on the peripheral surface of the clutch plate 82, or a device which detects the focus position by other methods. Alternatively, instead of determining the AF start-up direction by the focus position detecting device, the AF start-up direction may be determined by, for example, directly detecting the rotation of the focus ring FR by the potentiometer.

When the AF start-up direction is determined by the focus position detecting device, the manual clutch MCL is switched from on to off and the electrical clutch ECL is switched from off to on by the clutch motor FCM (switch of the manual clutch MCL and electrical clutch ECL from the manual side to electrical side), and then the focus driving motor FM is driven to electrically rotate the driving ring 50 in the AF start-up direction. This causes the focus lens F to be moved in the AF start-up direction demanded by the operator, and when the focusing position is detected by the AF processing, driving of the focus driving motor FM is stopped and the focus lens F is set to the focusing position.

Figure 11:
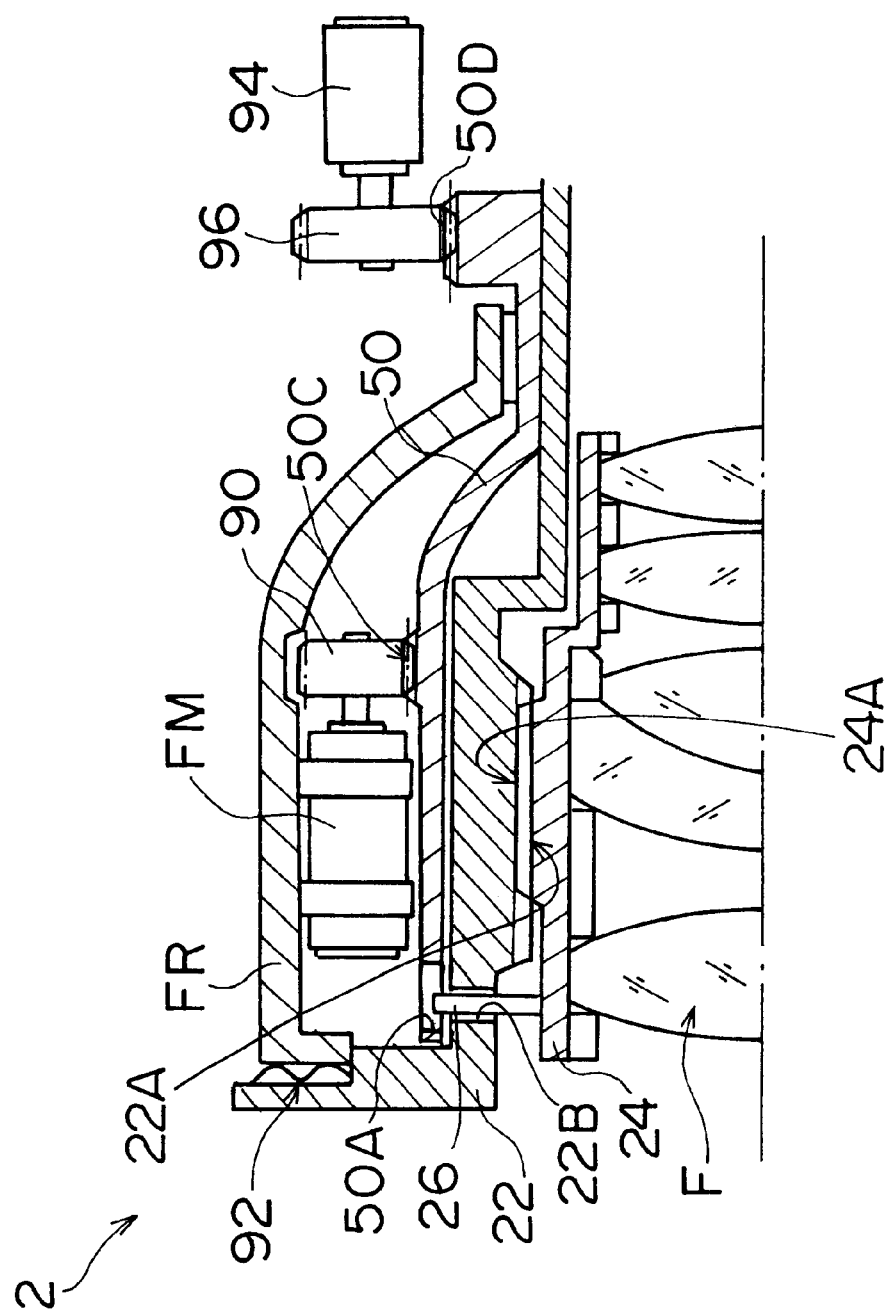
FIG. 11 is a side sectional view of a configuration of a focus driving mechanism of a third embodiment.

Next, a focus driving mechanism of a third embodiment will be described. FIG. 11 is a side sectional view of a configuration of the focus driving mechanism. The members identical to or having similar effects to the members in FIGS. 5 and 6 are designated by the same reference numerals and characters as in FIGS. 5 and 6. The focus driving mechanism shown in FIG. 11 is adapted to be capable of switching between manual and electrical focus driving without any clutch. As shown in FIG. 11, focus lenses (group) F constituted by a plurality of lenses are disposed in a barrel body 22 of the lens barrel 2, and a driving ring 50 is rotatably disposed on an outer periphery of the barrel body 22. A focus lens F is held by a lens holding frame 24, which is rotatably held in the barrel body 22 by engagement between helicoids 24A, 22A respectively formed on an outer peripheral surface of the lens holding frame 24 and the inner peripheral surface of the barrel body 22. On the other hand, a pin 26 is fixed to the lens holding frame 24 and inserted into an inserting hole 22B formed in the barrel body 22 to be engaged with a linear groove 50A in an optical axis direction formed on the driving ring 50. Therefore, rotation of the driving ring 50 causes the lens holding frame 24 to be rotated via the pin 26 in the barrel body 22. The lens holding frame 24 is rotated to be then moved back and forth in the optical axis direction in the barrel body 22 by the action of the helicoids 22A, 24A, and causes the focus lens F to be moved in the optical axis direction. Thus, focus adjustment is carried out.

An outer periphery of the driving ring 50 is rotatably provided with an operation ring (referred to as a focus ring FR) corresponding to the focus ring FR in FIG. 1. This focus ring FR is a manual focus operation member rotationally operated by a hand of the operator gripping the same, and is also used as an operation member for demanding an AF start-up direction in an AF standby state of the AF mode described above.

A focus driving motor FM shown in FIG. 11 is disposed between the focus ring FR and driving ring 50 and located in an inner peripheral side of the focus ring FR. A gear 90 fixed to an output shaft of the focus driving motor FM is arranged to mesh with a gear 50C formed on a peripheral surface of the driving ring 50.

The focus driving motor FM is locked (the output shaft becomes immovable) or unlocked by an electrical rocking device (electric brakes) or a mechanical locking device (a stopper engaged with a gear), and when carrying out the manual focus driving, the focus driving motor FM is locked by the locking device. In this condition, manual rotational operation of the focus ring FR causes the whole focus driving motor FM to be rotated around an optical axis together with the focus ring FR and causes the driving ring 50 to be rotated in an interlocked manner therewith. Thus, the focus lens F is moved as described above.

On the other hand, when carrying out the electrical focus driving, locking of the focus driving motor FM by the locking device is released. Driving of the focus driving motor FM in this condition causes the driving ring 50 to be rotated to move the focus lens F as described above. A corrugated plate spring 92 is provided between the tip of the focus ring FR and the barrel body 22, and when driving the focus driving motor FM to rotate the driving ring 50, the focus ring FR enters a stopped state by a frictional force of the corrugated plate 92.

For detecting the focus position, a gear 50D is formed on the peripheral surface of the driving ring 50, with which a gear 96 meshes which is fixed to an output shaft of the potentiometer 94.

As effects of the focus driving mechanism configured as described above, an example of the case where the mode is switched from the manual MF mode to AF mode will be described. In the manual MF mode, the focus driving motor FM is locked by the locking device (the state where the locking device is set to the manual side), and the operator can rotationally operate the focus ring FR directly by hand. At this time, an AF mode start switch is turned on by the operator to raise the AF mode and to raise the AF standby state with the locking device set to the manual side. In the AF standby state, rotational operation of the focus ring FR in the AF start-up direction as intended by the operator causes the driving ring 50 to be rotated in an interlocked manner therewith and causes the focus lens F to be moved. Then, a change of a focus position is detected by the potentiometer 94, and the AF start-up direction demanded by the operator is determined from the change.

When the AF start-up direction is determined by the potentiometer 94, locking of the focus driving motor FM by the locking device is released (the state where the locking device is set to the electrical side), and then the focus driving motor FM is driven to electrically rotate the driving ring 50 in the AF start-up direction. This causes the focus lens F to be moved in the AF start-up direction demanded by the operator, and when the focusing position is detected by the AF processing, driving of the focus driving motor FM is stopped, and the focus lens F is set to the focusing position.

Figure 12:
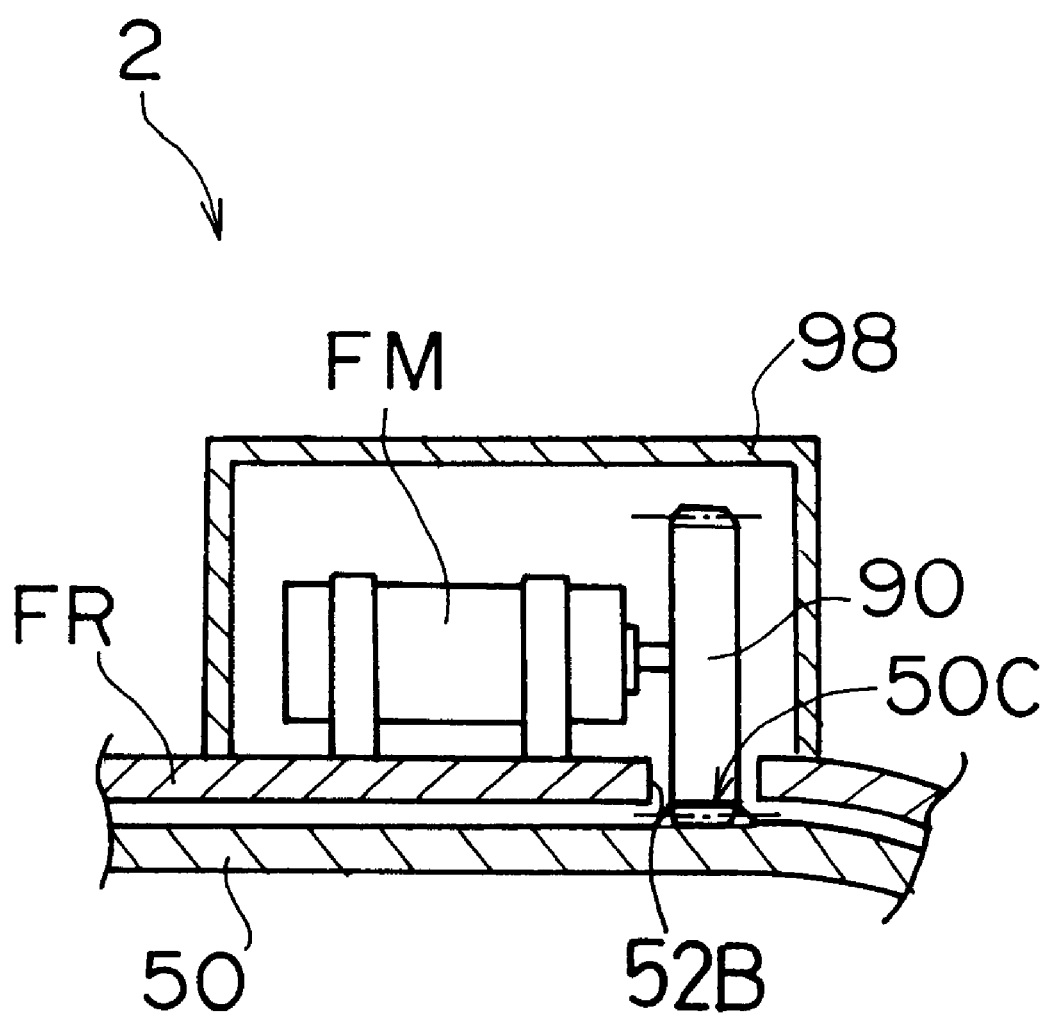
FIG. 12 is a side sectional view of a variation of the focus driving mechanism of the third embodiment in FIG. 11.

In the focus driving mechanism shown in FIG. 11, the focus driving motor FM is located on the inner peripheral surface of the focus ring FR, and the gear 50C formed on the outer peripheral surface of the driving ring 50 is arranged to mesh with the gear 90 of the focus driving motor FM. However, the focus driving motor FM may be located on the outer peripheral surface of the driving force 50, and the inner peripheral surface of the focus ring FR may be formed with a gear, with which the gear 90 of the focus driving motor FM meshes. Also, as shown in FIG. 12, the focus driving motor FM may be located on the outer peripheral surface of the focus ring FR, and the focus ring FR may be formed with a hole 52B inserting into the gear 50C formed on the outer peripheral surface of the driving ring 50 so that the gear 90 of the focus driving motor FM is engaged with the gear 50C of the driving ring 50 through the hole 52B. A box cover 98 covering the focus driving motor FM and gear 90 may be located on the focus ring FR to be used as a finger hooking portion or the like.

Also in the focus driving mechanism of this embodiment, a demand showing a focus position is provided on the driving ring 50 as the same as described in the focus driving mechanism of the second embodiment with FIG. 10.

The focus driving mechanism of the second and third embodiments described above are advantageous in that even when the focus ring FR, which is the manual operation ring, is gripped in a fixed state or an operation force is applied thereto during the electrical focus driving, no load is placed on the driving motor.

Figure 13:
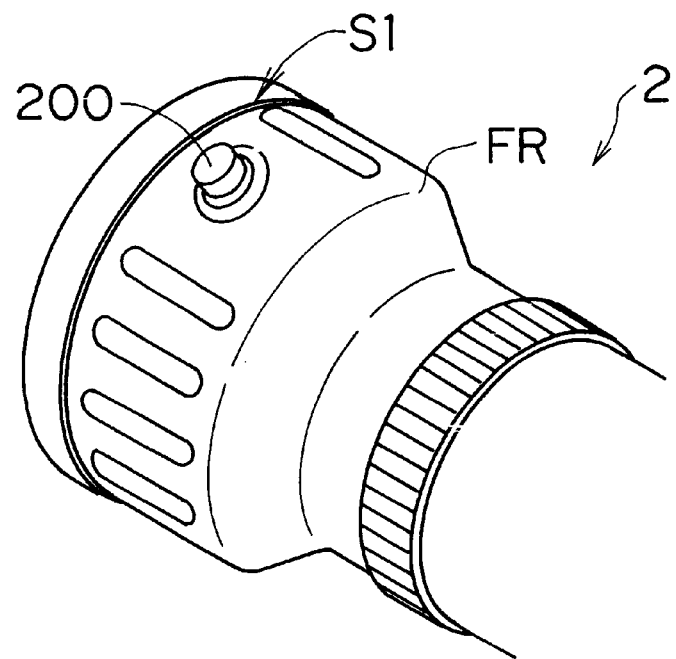
FIGS. 13(A) and 13(B) are a perspective view and a side sectional view, respectively, of an embodiment of an AF mode starting switch disposed on a lens barrel.
Figure 13:
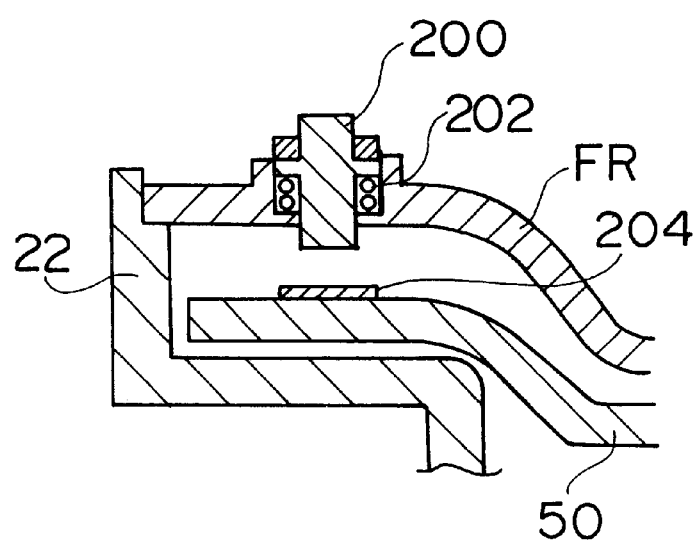

Next, a configuration of an AF mode starting switch will be described. The AF mode starting stitch can be provided on any portions such as an external controller, a lens barrel 2, drive unit 12, focus demand or other accessories, and not only one but a plurality of switches may be provided. Here, a configuration in the case of locating the AF mode starting switch on the lens barrel 2 (especially on the focus ring FR) will be described. FIGS. 13(A) and 13(B) are a view of appearance and a side sectional view, respectively of an embodiment of the AF mode starting switch located on the lens barrel 2, and FIG. 13(B) particularly shows a configuration of the AF mode starting switch in the focus driving mechanism of the second embodiment shown in FIG. 6. As shown in FIG. 13(A), the AF mode starting switch S1 is configured to be turned on when a pressing member 200 provided on the FR is pressed. As shown in FIG. 13(B), the pressing member 200 is energized upward in the figure (outward of the focus ring FR) by a spring 202 to be disposed in a hole formed in the focus ring FR, and a peripheral surface of the driving ring 50 is provided with an electrical intercept 204 opposite a bottom surface of the pressing member 200. Thus, when the operator presses the pressing member 200, the pressing member 200 makes contact with the electrical intercept 204 to energize therebetween and to turn on the AF mode starting switch S1. When the pressing member 200 is released, the pressing member 200 is returned to its original position by the spring 202, and the pressing member 200 is spaced apart from the electrical intercept 204 to turn off the AF mode starting switch S1. The configuration of the AF mode starting switch S1 of this embodiment can be applied to focus driving mechanisms of other embodiments as well as the focus driving mechanism of the second embodiment as shown in FIG. 6.

Figure 14:
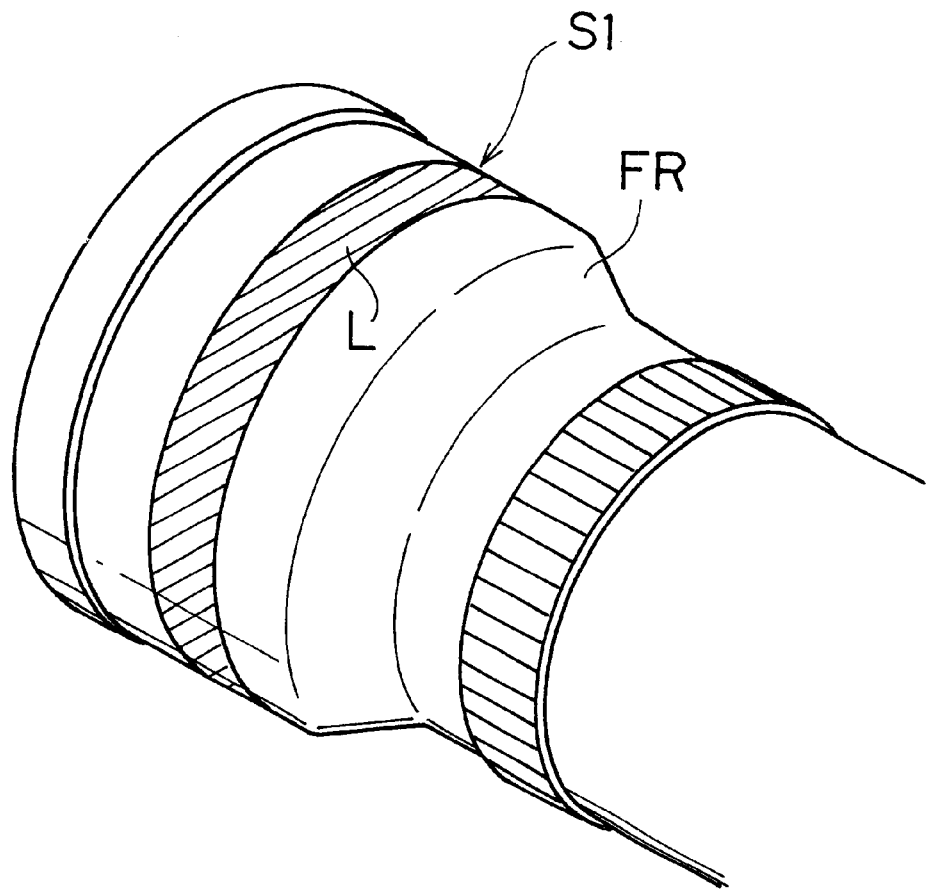
FIGS. 14(A) and 14(B) are a perspective view and a side sectional view, respectively, of another embodiment of an AF mode starting switch disposed on the lens barrel.
Figure 14:
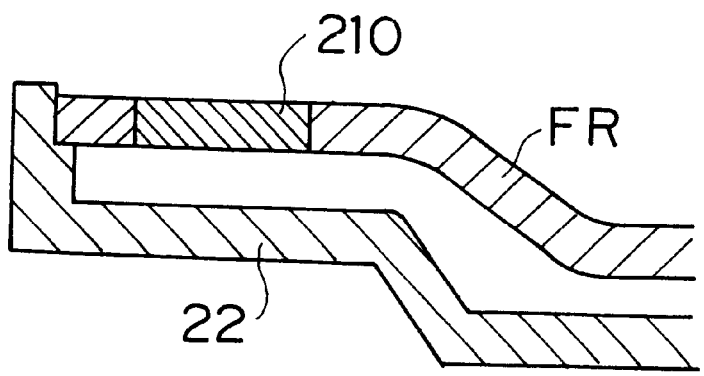
Figure 15:
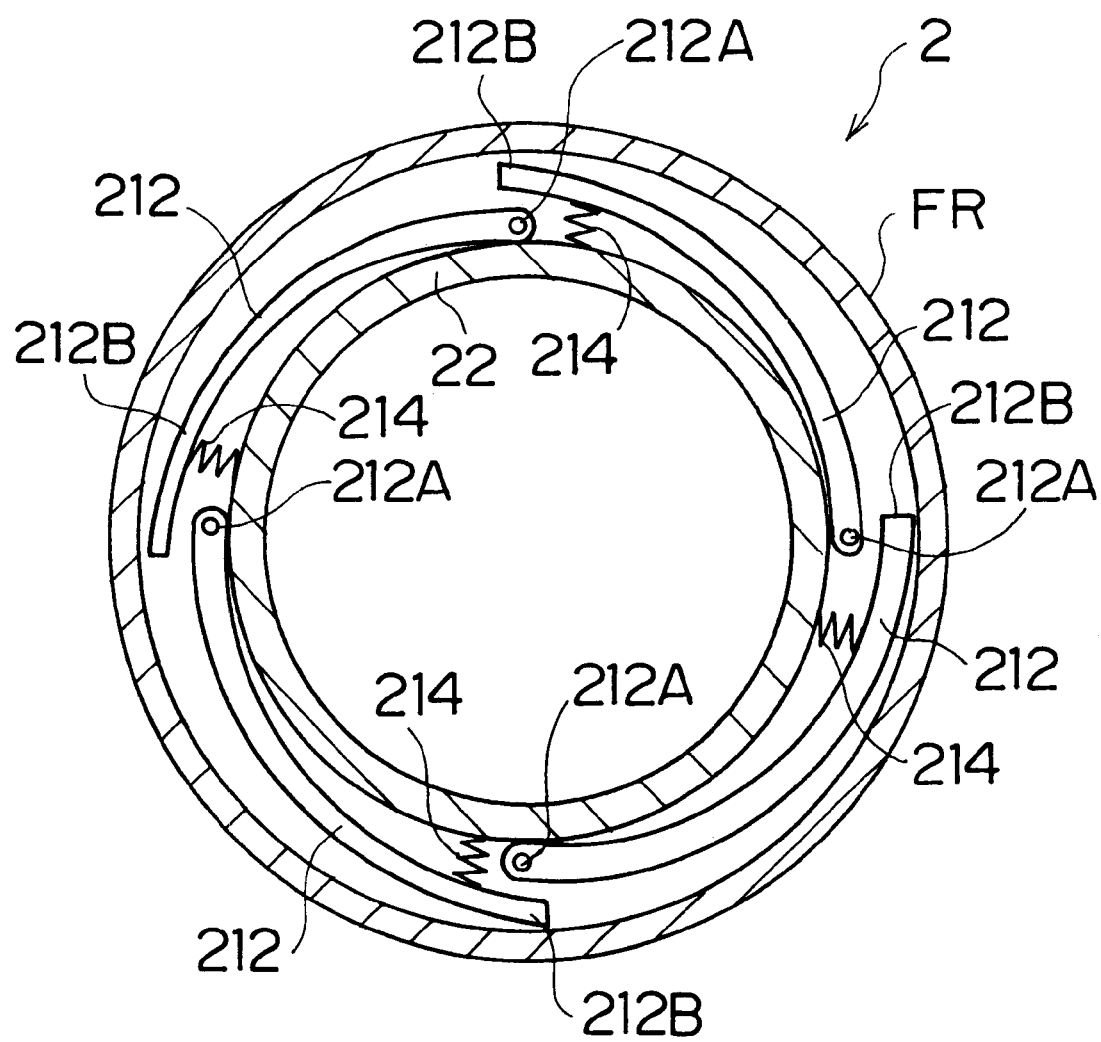
FIG. 15 is a front sectional view of another embodiment of an AF mode starting switch disposed on the lens barrel.

FIGS. 14(A) and 14(B) are a view of appearance and a side sectional view, respectively of another embodiment of an AF mode starting switch located on the lens barrel 2, and FIG. 14(B) particularly shows a configuration of the AF mode starting switch in the focus driving mechanism of the first embodiment shown in FIG. 5. The AF mode starting switch S1 is configured to be turned on when part of a peripheral surface portion of the focus ring FR shown in FIG. 14(A) (a range L shown by hatches in the figure) is pressed. As shown in FIG. 14(B), a pressure sensor 210 is disposed on the part, and a pressing force by the operator is determined by the pressure sensor 210 to turn on the AF mode starting switch S1, while the pressing force is not determined to turn off the AF mode starting switch S1. Similarly to this, the configuration of turning on/off the AF mode starting switch S1 by the pressing force on the focus ring FR by the operator may be such as shown in a front sectional view of FIG. 15. The focus ring FR is formed at part of its peripheral surface portion from a deformable elastic member, and, the AF mode starting switch S1 in FIG. 15 is configured so as to be turned on when the part formed from the elastic member is pressed. As shown in FIG. 15, a plurality of conductive plates 212 with arcuate sections are disposed between the focus ring FR and barrel body 22 so as to be superposed at their ends on respective adjacent conductive plates 212. One end 212A of each conductive plate 212 is rotatably mounted to the barrel body 22 with its axis in the optical axis direction, and the other end 212B is energized by a spring 214 in a direction making no contact with the adjacent end 212A (outwardly). Therefore, the respective conductive plates 212 are spaced apart from each other in a state where the elastic portion of the focus ring FR is not deformed, and when neither of the conductive plates 212 are thus energized, the AF mode starting switch S1 is turned off. On the other hand, when the operator presses the elastic portion of the focus ring FR, the portion is deformed and the conductive plate 212 disposed on the portion is internally pressed. Thus, the end 212B of the conductive plate 212 makes contact with the end 212A of the conductive plate 212 to energize between two conductive plates 212. In this way, when any two of the conductive plates 212 are energized, the AF mode starting switch S1 is turned on. The configuration of the AF mode starting switch S1 shown in FIGS. 14(A), 14(B) and 15 can be applied not only to the focus driving mechanism of the first embodiment shown in FIG. 5 but also to focus driving mechanisms of other type.

Figure 16:
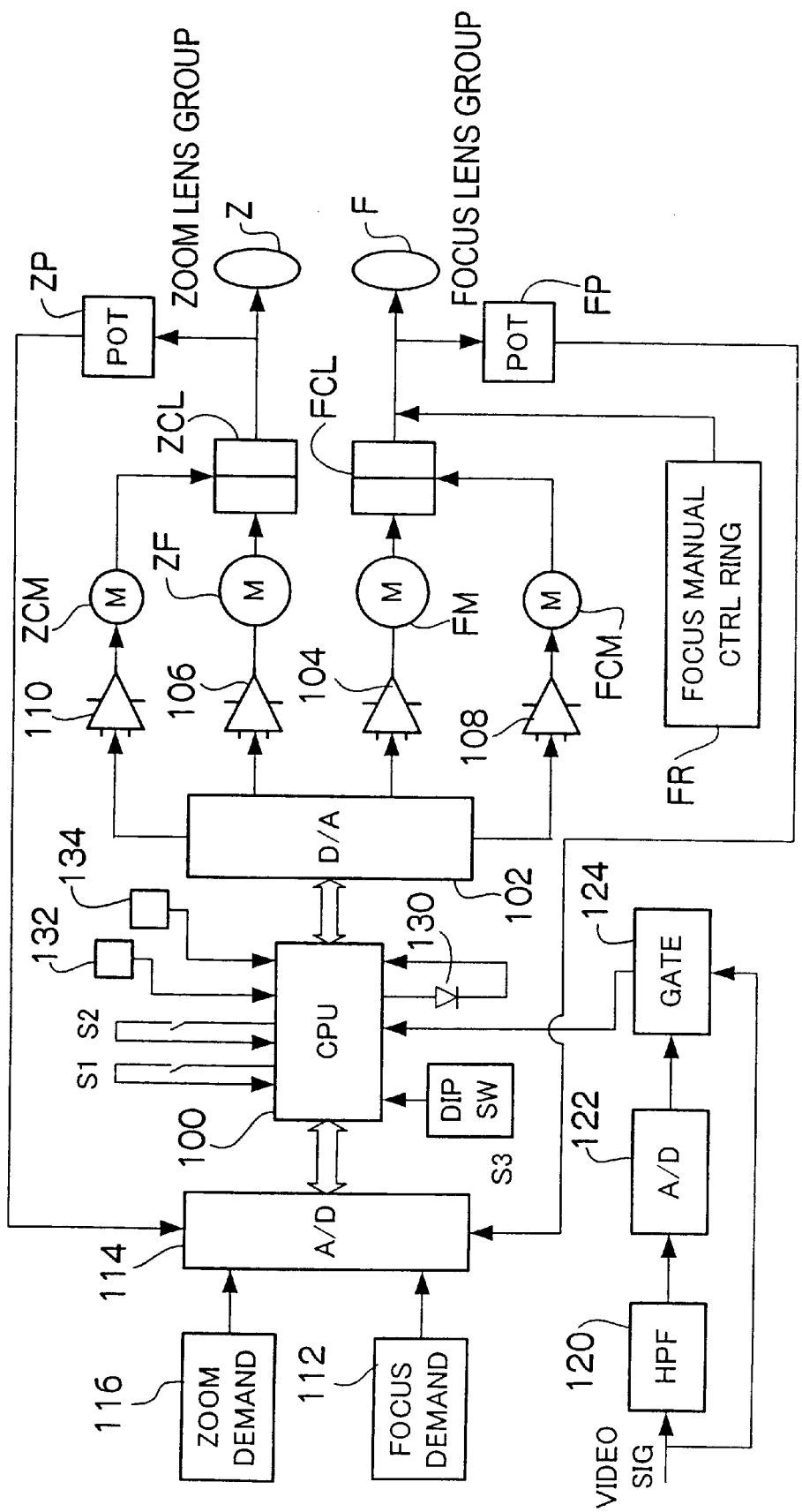
FIG. 16 is a block diagram of configuration parts with respect to focus control and zoom control.

Next, focus control of the lens apparatus 1 will be described. FIG. 16 is a block diagram showing a configuration part which relates to the focus control and zoom control. The focus driving mechanism shown in FIG. 16 comprises a focus lens F, focus driving motor FM, clutch FCL, clutch motor FCM, focus ring FR or the like. For the focus lens F and focus driving motor FM, power transmission is connected or disconnected by the clutch FCL, and the clutch FCL is turned on/off by the clutch motor FCM. When the clutch FCL is off (the clutch FCL is on the manual side), the focus ring FR can be manually rotationally operated to drive the focus lens F (manual focus driving), and when the clutch FCL is on (the clutch FCL is on the electrical side), the focus lens F can be electrically driven by the focus driving motor FM (electrical focus driving). A position of the focus lens F (focus position) is detected by a potentiometer FP.

The focus driving mechanism is, specifically, configured as the focus driving mechanisms of the first to third embodiments shown in FIGS. 5, 6 and 11, and the configuration of the focus driving mechanism shown in FIG. 16 is not strictly identical to the configurations of the first to third embodiments. However, in view of the fact that driving the clutch motor FCM to switch the clutch FCL to the manual or electrical side in FIG. 16 is similar to the fact that the clutch motor FCM is driven to switch the clutch FCL (see FIG. 5), or manual clutch MCL or electrical clutch ECL (see FIG. 6) in the first or second embodiment, the focus control described below can be applied to both of the focus driving mechanism of the first and second embodiments. In the third embodiment, no clutch FCL nor clutch motor FCM are used, but if the control of switching the clutch FCL to the manual or electrical side in FIG. 16 is replaced with the control of switching the locking device of the focus driving motor FM to the manual (on) or electrical (off) side in the third embodiment, the focus control described below can be also applied to the focus driving mechanism in the third embodiment.

In FIG. 16, the zoom driving mechanism is configured similarly to the focus driving mechanism, power transmission between a zoom lens Z and zoom driving motor ZM is connected or disconnected by a clutch ZCL, and the clutch ZCL is turned on/off by a clutch motor ZCM. When the clutch ZCL is off (the clutch ZCL is on the manual side), an unshown zoom ring ZR is manually rotationally operated to drive the zoom lens Z, and when the clutch ZCL is on (the clutch ZCL is on the electrical side), the zoom lens Z can be electrically driven by the zoom driving motor ZM. A position of the zoom lens Z is detected by a potentiometer ZP.

A CPU 100 shown in FIG. 16 is embedded in the drive unit 12, and the focus driving motor FM, zoom driving motor ZM, clutch motor FCM, clutch motor ZCM are respectively driven according to command signals output from the CPU 100.

When driving the focus driving motor FM, a command signal for demanding a rotational direction and rotational rate of the focus driving motor FM is output from the CPU 100 and applied to an amplifier 104 via a D/A converter 102. A driving voltage based on the command signal is then applied from the amplifier 104 to the focus driving motor FM, and the focus driving motor FM is rotated in the rotational direction and at the rotational rate demanded by the CPU 100.

When driving the zoom driving motor ZM, a command signal for demanding a rotational direction and rotational rate of the zoom driving motor ZM is sent from the CPU 100 to an amplifier 106 via the D/A converter 102 similarly to the case of driving the focus driving motor FM, thus a driving voltage based on the command signal is applied to the focus driving motor ZM, and the zoom driving motor ZM is rotated in the rotational direction and at the rotational rate demanded by the CPU 100.

When switching the clutch FCL from on (the electrical side) to off (the manual side), or vice versa, a command signal for demanding a rotational direction and rotational rate of the clutch motor FCM for switching the clutch FCL to on or off is output from the CPU 100 and applied to an amplifier 108 via the D/A converter 102. A driving voltage based on the command signal is then applied from the amplifier 108 to the clutch motor FCM, and the clutch motor FCM is rotated in the rotational direction and at the rotational rate demanded by the CPU 100. Thus, the clutch FCL is switched to on or off.

When switching the clutch ZCL from on (the electrical side) to off (the manual side), similarly to switching the clutch FCL to on or off, a command signal for demanding a rotational direction and rotational rate of the clutch motor ZCM for switching the clutch ZCL to on or off is sent from the CPU 100 to an amplifier 110 via the D/A converter 102, thus a driving voltage based on the command signal is applied to the clutch motor ZCM, and the clutch motor ZCM is rotated in the rotational direction and at the rotational rate demanded by the CPU 100. Thus, the clutch FCL is switched to on or off.

Next, processings of the focus control in the CPU 100 will be described in detail. Focus adjustment includes an MF mode and AF mode as described above, and a processing of the CPU 100 in the MF mode will be first described. The MF mode includes "a manual MF mode" and "an electrical MF mode", and in the manual MF mode, the operator directly rotationally operate the focus ring FR to carry out the focus adjustment, and in the electrical MF mode, an external controller such as focus demand 112 is connected to the drive unit 12 as shown in FIG. 16, and the electrical operation member of the focus demand 112 is operated to carry out the focus adjustment. Setting of the manual MF mode and electrical MF mode can be selected by the operator with a predetermined switch, or automatically selected by the CPU 100 by determining whether the external controller is connected.

When setting to the manual MF mode, in the state where the clutch FCL is set to the electrical side (on), the CPU 100 outputs a command signal for switching the clutch FCL to the manual side (off) to the amplifier 108 of the clutch motor FCM. This causes the power by the rotational operation of the focus ring FR to be transmit to the focus lens F (a state where the power transmission between the focus driving motor FM and focus ring FR is disconnected), and the focus lens F can be manually moved by the focus ring FR. In this mode, the CPU 100 does not control the focus driving motor FM.

When setting to the electrical MF mode, in the state where the clutch FCL is set to the manual side (on), the CPU 100 outputs a command signal for switching the clutch FCL to the electrical side to the amplifier 108 of the clutch motor FCM. This causes the power of the focus driving motor FM be transmitted to the focus lens F, and the focus lens F can be electrically moved by the focus driving motor FM. The CPU 100 then outputs the command signal for driving the focus driving motor FM to the amplifier 104 of the focus driving motor FM according to the signal sent from the focus demand 112 via the A/D converter 114. Here, the signal from the focus demand 112 is generally a signal for demanding a position to be focused, and the CPU 100 obtains a present position of the focus from the potentiometer FP via the A/D converter 114, and outputs the command signal for demanding a rotational direction and rotational rate in compliance with a difference between the position to be focused and present position.

Similarly to the manual MF mode and electrical MF mode, a zoom ring 6 (see FIG. 1) may be rotationally operated directly by hand to carry out zoom adjustment, and the electrical operation member of zoom demand 116 may be operated to drive the zoom driving motor ZF and to thereby carry out zoom adjustment.

Next, a processing of the CPU 100 in the AF mode will be described. An AF processing will be first described among processings in the AF mode. An image signal output from the camera body is input through a predetermined terminal of the drive unit 12, and from the image signal, a high frequency component only is extracted by a high-pass filter (HPF) 120 as shown in FIG. 16. Then, the high frequency component of the image signal is converted to digital signals by the A/D converter 122 and input to the gate circuit 124. In the gate circuit 124, digital signals within a range corresponding to a focus area (for example, the center of the screen) are extracted from the digital signals for one screen input from the A/D converter 122, and the values of the extracted digital signals are integrated. Then, the integrated value is input to the CPU 100 as a focus evaluation value.

In the AF processing, the CPU 100 causes the clutch FCL to be set to the electrical side, and the focus driving motor FM is driven to thereby start movement of the focus lens F in the AF start-up direction demanded by the operator as described in detail below, and concurrently with the movement, the focus evaluation value is obtained from the gate circuit 124. When the focus evaluation value is more than the prescribed value and shows a clear increasing tendency in the AF start-up direction, a position where the focus evaluation value is switched form the increasing tendency to decreasing tendency is then detected while moving the focus lens F in the increasing direction of the focus evaluation value, and the focus lens F is set to the position. The position where the focus evaluation value is switched form the increasing tendency to decreasing tendency is a focusing position with a largest (maximum) focus evaluation value, and this processing causes the focus lens F to be set to the focusing position existing in the AF start-up direction apart from the AF starting position. Such AF is known as what is called as hill-climbing AF except for designation of the AF start-up direction by the operator.

The AF processing includes a processing of detecting the focusing position according to the focus evaluation value and processing of electrically moving the focus lens F, and the hill-climbing AF is such that the focus lens F is moved in the increasing direction of the focus evaluation value in the latter processing. However, the moving direction of the focus lens F is demanded as the AF start-up direction by the operator, so that the focus lens F may be moved in the AF start-up direction independently of the focus evaluation value, or other methods may be adopted. Further, in the case of the hill-climbing AF as described above, when the increasing tendency of the focus evaluation value is detected in the direction opposite the AF start-up direction demanded by the operator, that is, when the decreasing tendency of the focus evaluation value is detected in the AF start-up direction, the focus lens F is moved in the direction opposite the AF start-up direction, however, the focus lens F may be moved in the AF start-up direction demanded by the operator without the hill-climbing AF within a range where the focus evaluation value shows the decreasing tendency in the AF start-up direction.

Next, a processing of the whole AF mode will be described. When the AF mode starting switch S1 shown in FIG. 16 is turned on in the MF mode, the CPU 100 raises an AF standby state before starting the AF processing. The AF standby state is a state of waiting for the operator to demand the AF start-up direction in the infinite or close-up direction.

The demand of the AF start-up direction is carried out by MF operation by the operator. Specifically, the AF start-up direction is demanded in the rotational direction by manually operating the focus ring FR, or in the operational direction by operating the electrical operation member of the focus demand 112 or the like. However, the AF start-up direction may be adapted to be demanded by either of the operations, or the AF start-up direction may be adapted to be demanded simply by the former operation when the mode before the AF mode starting switch S1 is turned on is the manual MF mode, or simply by the latter operation when the mode before the AF mode starting switch S1 is turned on is the electrical MF mode. Further, as shown in FIG. 13(A) or the like, the AF mode starting switch S1 is provided on the lens barrel 2 and also on the focus demand 112, and the AF start-up direction may be adapted to be demanded simply by the former operation when the AF mode starting switch S1 of the lens barrel 2 is turned on, or simply by the latter operation when the AF mode starting switch S1 of the focus demand 112 is turned on. Alternatively, the AF start-up direction may be demanded with a dedicated demand switch instead of demanding the AF start-up direction by the MF operation. In the description below, mainly considered is the case where the focus ring FR is manually operated to demand the AF start-up direction in the rotational direction, but the same processing can be applied even when the electrical operation member such as the focus demand 112 is operated to demand the AF start-up direction in the operational direction.

In the AF standby state, the CPU 100 first sets the clutch FCL to the manual side and monitors the operational direction of the focus ring FR. A signal of the focus position output from the potentiometer FP is obtained via the A/D converter 114, and by the change of the focus position, the operational direction of the focus ring FR is determined. When a detecting device (such as a potentiometer) which detects rotation of the focus ring FR, the operational direction of the focus ring FR can be directly determined by the detecting device.

When the operator rotationally operates the focus ring FR for demanding the AF start-up direction, the CPU 100 determines the AF start-up direction demanded by the operator with the signal of the focus position from the potentiometer FP. When the operator demands the AF start-up direction by operating the electrical operation member such as the focus demand 112, the CPU 100 can determine the AF start-up direction demanded by the operator from the change of the command signal of the focus position sent from the focus demand 112.

When the AF start-up direction is demanded by the operator, the CPU 100 sets the clutch FCL to the electrical side. The CPU 100 then outputs the command signal to the amplifier 104 of the focus driving motor FM to rotate the focus driving motor FM in the AF start-up direction. This causes the focus lens F to be moved in the AF start-up direction demanded by the operator and to be set to the focusing position by the AF processing.

In the AF standby state, the clutch FCL is not necessarily set to the manual side but may be set to the electrical side. In the focus driving device in the second of third embodiment in FIGS. 6 and 11, the focus ring FR can be rotationally operated even when the manual clutch MCL and electrical clutch ECL corresponding to the clutch FCL or the locking device are set to the electrical side, so that the AF start-up direction can be demanded with the focus ring FR on condition that the detecting device for detecting rotation of the focus ring FR is located. At this time, the focus lens F may be electrically moved according to operation of the focus ring FR for demanding the AF start-up direction as required. The same applies to the case of demanding the AF start-up direction by the electrical operation member. However, it is advantageous to set the clutch FCL to the manual side in the AF standby state as described above, that is, to set to a manual focus driving state. For example, in the case where the focus operation member for manual focus driving cannot be operated in the electrical focus driving state as in the first embodiment in FIG. 5, the focus operation member can be operated by setting to the manual focus driving state in the AF standby state, and thus the AF start-up direction can be demanded. Also, the focus lens F is moved concurrently with the demand operation of the AF start-up direction, so that the operational direction can be determined by the signal of the potentiometer FP for determining the position of the focus lens F, eliminating the need for a special detecting device which detects rotation of the focus ring FR.

The above processing steps of the CPU 100 will be described by a flowchart in FIG. 17. First, when the power is turned on, the CPU 100 carries out initialization (step S10) and then a processing (mainly an MF mode processing) other than the AF mode (step S12). At this time, an AF mode displaying LED 130 (see FIG. 16) for demanding that the present mode is the AF mode is turned off (switched off) (step S14). Then, the focus operation flag is cleared (step S16). The AF mode displaying LED 130 is provided on the focus ring FR, drive unit 12, focus demand 112 or the like.

Then, the CPU 100 determines whether the AF mode starting switch S1 is on (step S18). If no, the flow returns to the processing of the step S12. If yes, the flow proceeds to the processing of the AF standby state of the AF mode, and first the clutch FCL is turned off and set to the manual side (step S20). The AF mode displaying LED 130 is turned on (switched on) (step S22). When the clutch FCL has been already set to the manual side, the processing of the step S20 is not carried out.

Next, the CPU 100 determines whether the focus ring FR is operated for determining the demand of the AF start-up direction by the operator (step S24). If no, it is determined whether the focus operation flag is on (step S26). When the focus ring FR is never operated in the AF standby state not to demanded the AF start-up direction, it is determined no in this processing, and the flow returns to the step S18, and the processings of the steps S18 to S26 are repeated until the time when the focus ring FR is operated.

On the other hand, when it is determined yes in the step S24, that is, when it is determined that the focus ring FR is operated, the CPU 100 determines whether the operation is carried out in the infinite direction (step S28). If yes, an infinite direction flag is turned on (step S30). If no, the infinite direction flag is turned off (step S32). The focus operation flag is then turned on (step S34), and the flow returns to the step S18.

When the operation of the focus ring FR is stopped, the detection of the demand of the AF start-up direction is completed, and it is determined no in the step S24 and determined yes in the subsequent step 26. Then, the CPU 100 sets the clutch FCL to the electrical side (step S36). It is determined whether the infinite direction flag is on (step S38), and if determined yes, the focus driving motor FM is rotated in the infinite direction to start movement of the focus lens F in the infinite direction (step S40). If determined no, the focus driving motor FM is rotated in the close-up direction to start movement of the focus lens F in the close-up direction (step S42).

The CPU 100 carries out the hill-climbing AF processing (step S44) and determines whether the focusing position is detected (step S46), and if determined yes, the focus driving motor FM is stopped at the focusing position to stop the focus lens F. This causes the focus lens F to be set to the focusing position and focusing by the AF to be completed. When the focusing is completed, the CPU 100 clears the focus operation flag (step S48), and the flow returns to the step S18.

In the above processing steps of the CPU 100, the AF processing is started when the operation of the focus ring FR is stopped in the AF standby state, but the AF processing can be started in other timing. For example, the AF processing may be started when detecting an operation amount of the focus ring FR more than a certain value, or when detecting an operation rate of the focus ring FR more than a predetermined value. The mode may be returned to the MF mode when operation of the MF member such as the focus ring FR is detected in the AF processing.

Next, processings after completion of focusing by the AF in the AF mode will be described. Considered as one aspect of the processings after completion of focusing by the AF in the AF mode is a case of returning again to the AF standby state to repeat the processings of the AF mode. The processing steps of the CPU 100 at this time will be described. When the AF mode starting switch S1 is configured to be switched on/off by predetermined operation and to hold the switched state after the operation force is released (holding type switch) like a slide switch, the processing steps of the CPU 100 is as shown in the flowchart in FIG. 17. That is, after the processing of the step S48 is finished, the flow returns to the step S18, and then it is determined whether the AF mode starting switch S1 is on, and once the AF mode starting switch S1 is turned on, it is determined yes in this determination process as long as the AF mode starting switch S1 is turned off by the operator, and the processings of the AF mode are repeated.

Figure 17:
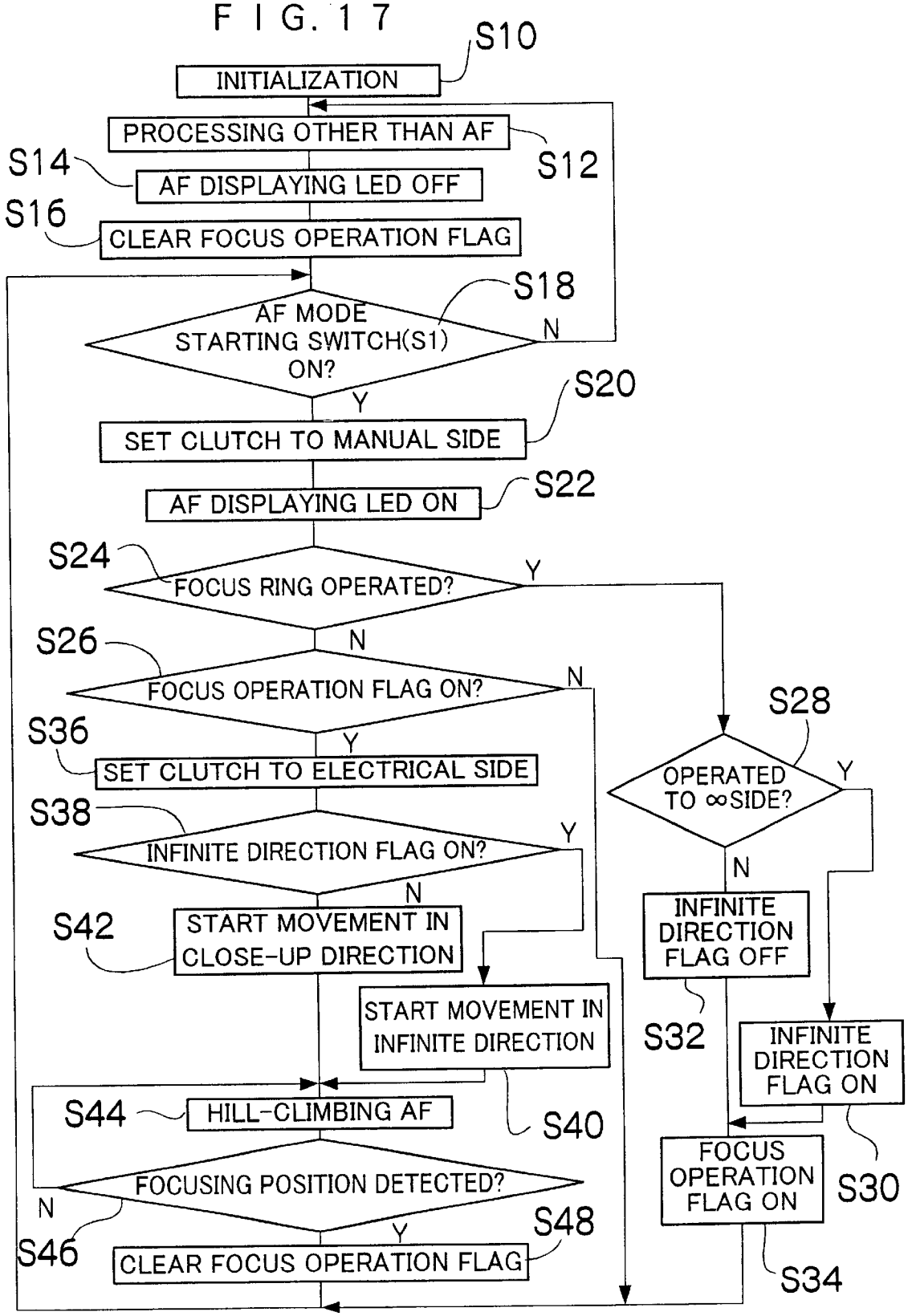
FIG. 17 is a flowchart showing basic processing steps of a CPU.

In the case where the AF mode starting switch S1 is configured to be on only when the operation force is applied as FIGS. 13(A), 13(B), 14(A), 14(B) and 15, and to be off when the operation force is released (automatic returning type switch), for each detection that the AF mode starting switch S1 is turned on, recognition of the state of the AF mode starting switch S1 in the processing of the CPU 100 is switched between on and off like the holding type switch, and the state is held until detection that the AF mode starting switch S1 is next turned on, thus the processing steps of the CPU 100 for repeating the AF mode processings are as shown by the flowchart in FIG. 17.

Considered as another aspect of the processing after completion of focusing by the AF is a case of returning to the MF mode once the focusing is completed. In this case, it is preferable to use the automatic returning type switch rather than the holding type as the AF mode starting switch S1. The processing steps of the CPU 100 at this time is as shown in the flowchart in FIG. 17. That is, after completion of focusing by the AF and when returning to the determination processing of the step S18, it is determined no in the determination processing unless the AF mode starting switch of the automatic returning type is on, and the mode returns from the AF mode to MF mode.

Considered as further aspect of the processings after completion of focusing by the AF is a case of continuing the AF after completion of focusing. That is, the AF standby state occurs only immediately after the AF mode starting switch S1 is turned on, and once focusing is completed, the focus is always monitored to detect deviation of the focus, and then the AF is activated to permit always maintaining focusing. The processing steps of the CPU 100 at this time are changed so as to repeat the AF processings of the steps S44 and S46 until the AF mode is released in the flowchart in FIG. 17. The AF mode can be released by, for example, switching the AF mode starting switch of the holding type from on to off, or turning on again the AF mode starting switch of the automatic returning type.

When continuing the AF after completion of focusing, fine adjustment may be carried out by the MF for each completion of focusing. The processing steps of the CPU 100 at this time are such that after completion of focusing by the AF, the AF processing is once stopped to permit focus adjustment by the MF operation. For example, after completion of focusing by the AF, the clutch FCL is switched from the electrical to manual side to permit focus adjustment by the manual rotational operation of the focus ring FR. Alternatively, after completion of focusing by the AF, in the state where the clutch FCL is set to the electrical side, the MF operation is detected and the focus lens F is electrically moved according to the operation. The MF operation at this time may be not only the operation of the electrical operation member of the focus demand 112 or the like, but also the operation of the focus ring FR on condition that there is the detecting device which detects rotation of the focus ring FR in the case where rotational operation of the focus ring FR is possible in the electrical focus driving state as the focus driving mechanism of the second and third embodiments in FIGS. 6 and 11.

Such fine adjustment by the MF is finished, for example, when the MF operation such as to move the focus lens F at a rate higher than the prescribed value is detected by the CPU 100, and the CPU 100 then returns to the AF processing. Permitting such fine adjustment of the focus allows the operator to correct the focus by the MF operation after focusing by the AF.

Figure 18:
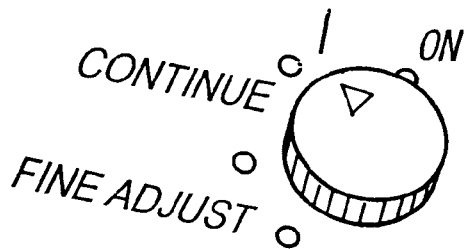
FIGS. 18(A), 18(B) and 18(C) show examples of a configuration of a switch for selecting a processing after completion of focusing by AF in an AF mode.
Figure 18:
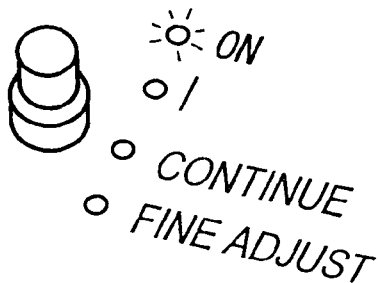
Figure 18:
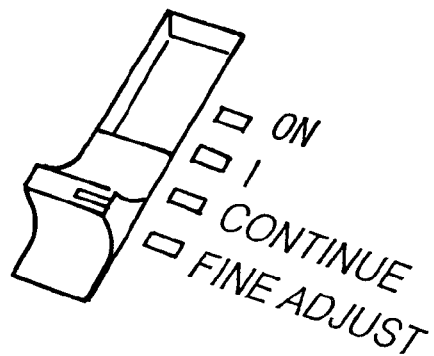

The aspects of processings after completion of focusing by the AF as described above may be configured to be arbitrarily selected by the operator with a predetermined switch. Here, after completion of focusing by the AF, it is assumed that a mode of switching to the AF standby state is an AF standby state returning mode, that a mode of switching to the MF mode is an MF returning mode, that a mode of continuing the AF is an AF continuing mode, and that the mode where fine adjustment by the MF is possible after completion of focusing by the AF especially in the AF continuing mode is a fine adjustment mode. Switches for selecting these modes may be provided on any parts, for example, the external controller such as the lens barrel 2, drive unit 12, focus demand 112, or other accessories, and are configured as shown in, for example, FIGS. 18(A), 18(B) and 18(C). FIG. 18(A) shows a switch capable of selecting a desired mode by a knob, and when setting to a position indicated as "ON", the AF standby state returning mode is selected, when setting to a position indicated as "1", the MF returning mode is selected, when setting to a position indicated as "continue", the AF continuing mode is selected, and when setting to the position to "fine adjust", the fine adjustment mode is selected. FIG. 18(B) shows a switch capable of successively switching the modes for each push of a button, and the presently selected button is indicated by a lighting position of a lamp. FIG. 18(C) shows a switch capable of selecting a desired mode by a slide switch. The selected mode may be displayed on a viewfinder of the camera body in manners as shown in FIGS. 18(A), 18(B) and 18(C). Further, the lamp for each mode may be provided on the drive unit 12, or displayed on the viewfinder to light up the lamp of the selected mode.

Figure 19:
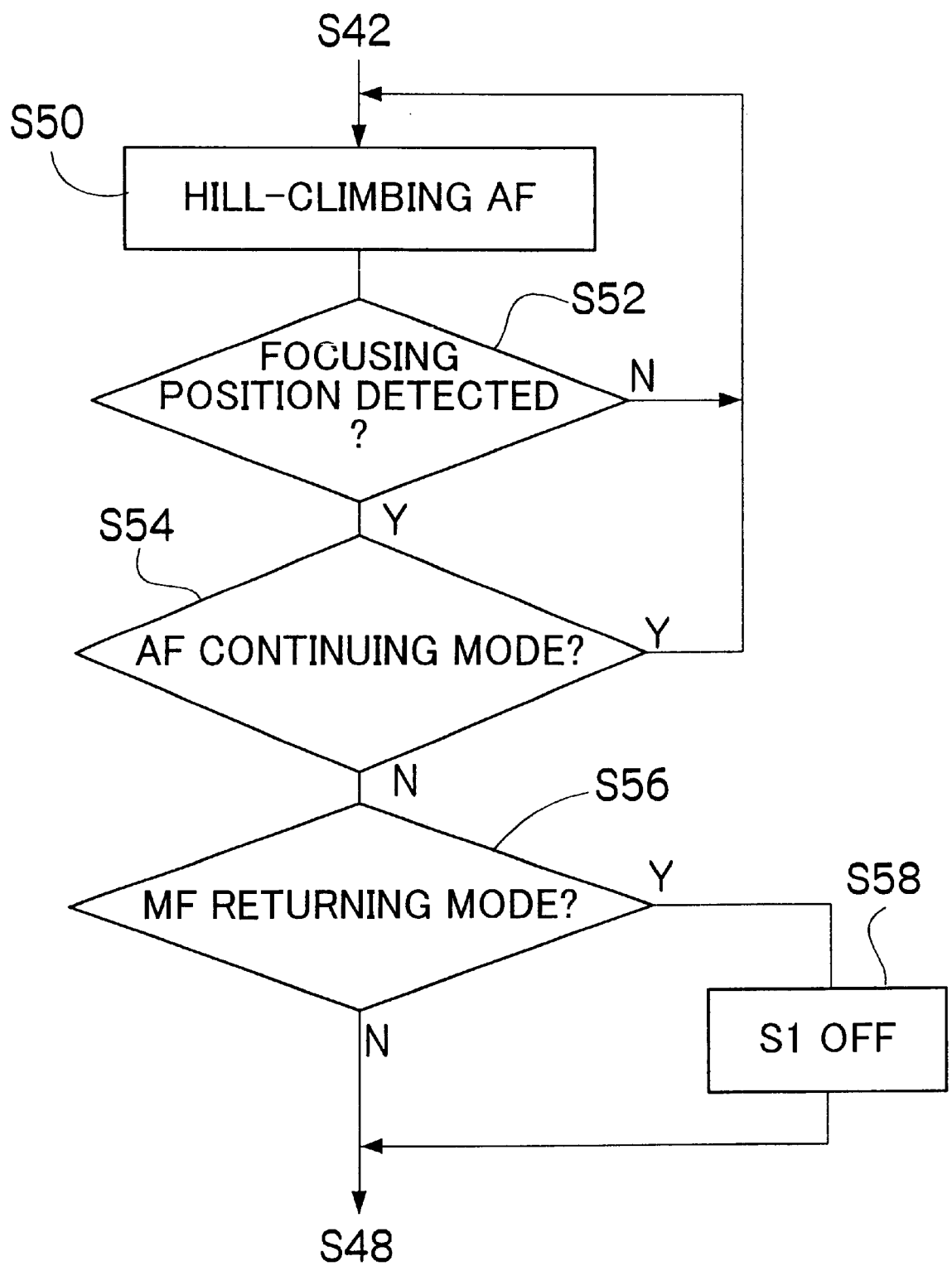
FIG. 19 is a flowchart showing processing steps of a CPU when a processing after completion of focusing by the AF in the AF mode is selectable.

In this way, for the processing steps of the CPU 100 in the case of permitting selection of the processing after completion of focusing by the AF, the processings of the steps S44 to S46 of the flowchart in FIG. 17 are changed to the processings of the flowchart shown in FIG. 19. However, the flowchart in FIG. 19 is the case of permitting selection of three modes of the AF standby state returning mode, MF returning mode, AF continuing mode, the AF mode starting switch S1 is of the automatic returning type, and the state of the AF mode starting switch in the processing of the CPU 100 is switched between on and off every time the AF mode starting switch S1 is turned on. After the processing of the step S42, the above described hill-climbing AF is carried out (step S50), and it is determined whether the focusing position is detected (step S52), and when it is determined yes, the focus driving motor FM is stopped in the focusing position to stop the focus lens F. This causes the focus lens F to be set to the focusing position, completing focusing by the AF.

Then, the CPU 100 determines whether the mode is set to the AF continuing mode (step S54). If yes, the flow returns to the step S50. That is, the AF processing is carried out in such a manner that the focus lens F is always placed in the focusing position. If determined no in the step S54, it is then determined whether the mode is the MF returning mode (step S56). If determined yes, the state of the AF mode starting switch S1 in the processing is turned off (step S58), then the flow proceeds to the step S48. Thus, it is determined no in the step S18 of the flowchart in FIG. 17, proceeding to the processing of the MF mode. If determined no in the step S56, the flow proceeds to the step S48 as it is. Thus, it is determined yes in the step S18, proceeding to the AF standby state. In the above flowchart, three modes of AF standby state returning mode, MF returning mode, AF continuing mode are adapted to be selectable, but any two of the modes may be adapted to be selectable.

Next, the processing steps of the CPU 100 in the case of permitting setting of the fine adjustment mode in the AF continuing mode. In this case, for the processing steps of the CPU 100, processings after determined yes in the step S54 of the flowchart in FIG. 19 are added like the flowchart in FIG. 20. The MF operation for carrying out fine adjustment of the focus after completion of focusing by the AF is carried out by the focus ring FR or focus demand 112, and the focus driving based on the MF operation is electrically carried out. That is, the focus driving mechanism is configured so as to be capable of the rotational operation of the focus ring F even in the electrical focus driving state as in the second or third embodiment in FIG. 6 or FIG. 11, and the detecting device which detects rotation of the focus ring FR is located, and the focus driving is electrically carried out according to the MF operation including operation of the focus ring FR without switching to the manual focus driving after completion of focusing by the AF.

Figure 20:
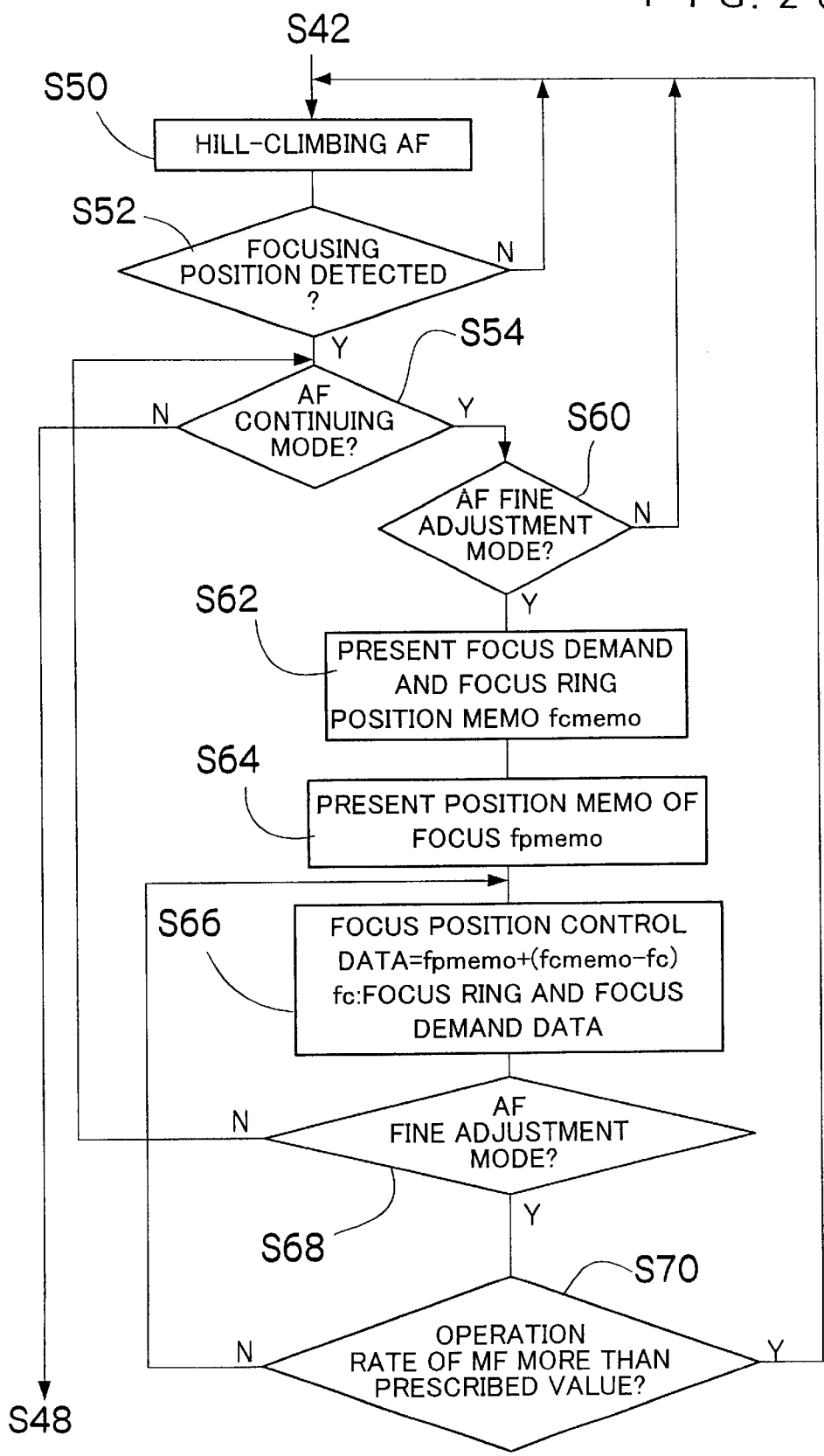
FIG. 20 is a flowchart showing processing steps of the CPU when fine adjustment by MF is allowed as an aspect of the processing after completion of focusing by the AF in the AF mode.

In FIG. 20, the processings of the CPU 100 in the steps S50 to S54 are as shown in the flowchart in FIG. 19. When determining that the mode is set to the AF continuing mode, the CPU 100 determines whether the mode is set to the AF fine adjustment mode (step S60). When the AF fine adjustment mode can be selected as a mode independent of the AF continuing mode like the switch shown in FIGS. 18(A), 18(B) and 18(C), the CPU 100 determines that the AF continuing mode is selected concurrently with the selection of the AF fine adjustment mode. In the step S60, if determined no, the flow returns to the step S50. Thus, the processing of the AF continuing mode without any fine adjustment of the focus by the MF is carried out. If determined yes in the step S60, the present position of the operation member for carrying out next MF operation, that is, the present position of the focus ring FR and the position of the focus demand 112 in the case where the focus demand 112 is connected (the focus position demanded with the signal sent from the focus demand 112) is stored (step S62). A parameter at this time is specified as "fcmemo". Then, the present position of the focus is stored from the potentiometer FP (step S64). The parameter at this time is specified as "fpmemo". Then, focus position control data:

$$fpmemo+(fcmemo-fc)$$

is calculated (step S66). Here, "fc" represents a position of the operation member of the MF from a start of the MF operation (focus ring and focus demand data), represents the position of the focus ring FR when the focus ring FR is operated, and represents the position of the focus demand 112 when the operation member of the focus demand 112 is operated. The CPU 100 drives the focus driving motor FM to electrically move the focus lens F to the position shown by the focus position control data. Thus, the focus lens F is moved by the MF operation by the operator after completion of focusing by the AF.

Then, the CPU 100 determines whether the mode is the AF fine adjustment mode (step S68), if determined no, that is, if the AF fine adjustment mode is released, the flow returns to the step S54. If determined yes, it is then determined whether the operation rate of the MF is more than the prescribed value (step S70). If determined no, it is determined that the MF operation is the operation for the fine adjustment of the focus, and the flow returns to the step S66. If determined yes, it is determined that the MF operation is a demand of finish of the fine adjustment of the focus, and the flow returns to the step S50. Thus, the AF is restarted.

In the above flowchart, the case where the fine adjustment of the focus by the MF is electrically carried out after completion of focusing by the AF is described, but the fine adjustment may be manually carried out. In that case, the clutch FCL is switched to the manual side after completion of focusing by the AF, and after the finish of the focus fine adjustment, a processing of switching the clutch FCL to the electrical side is added.

Figure 21:
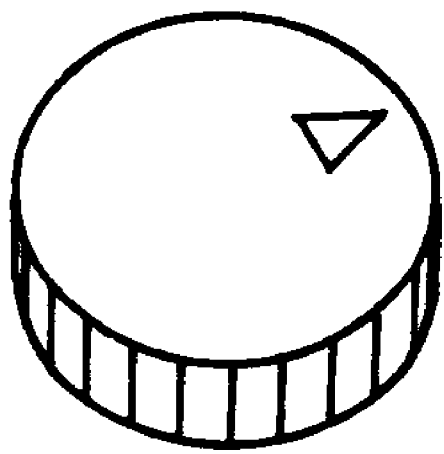
FIG. 21 shows a knob for selecting a Q. Z. mode or Q. Z. & AF mode.

Next, a processing of the CPU 100 in the case where the mode is automatically switched to the AF mode in a quick zoom will be described. The quick zoom is a function that the zoom lens F is immediately moved to a telephoto end when a predetermined switch S2 of the drive unit 12 (see FIG. 16) is turned on and returned to an original position when the switch S2 is turned off. The switch S2 is, for example, of the push-button type, and the switch S2 is turned on when the button is pushed and turned off when it is released. Such a quick zoom is generally used in the case where the subject to be focused is zoomed to carry out focus adjustment with high accuracy, so that it is convenient that the mode is automatically switched to the AF mode when the switch S2 is turned on. Thus, a mode of automatically entering the AF mode when the switch S2 is turned on (hereinafter referred to as the quick zoom being on) is adapted to be selectable. This mode is called a "Q. Z. & AF mode", and the mode of not automatically entering the AF mode even when the quick zoom is turned on is called a "Q. Z. mode". These modes may be selectable by a knob shown in FIG. 21 provided on the drive unit 12.

Figure 22:
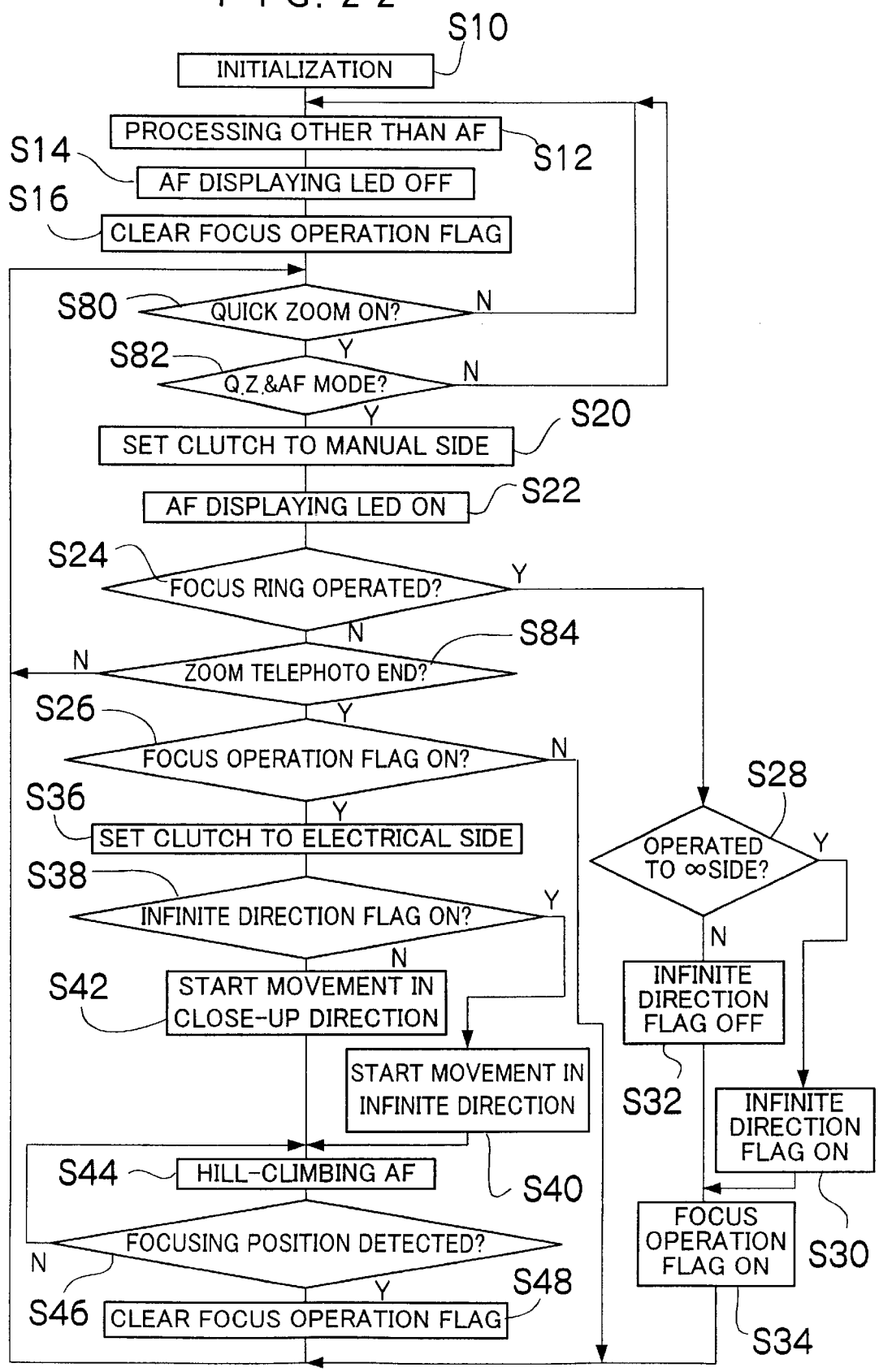
FIG. 22 is a flowchart showing processing steps of focus control of a CPU when Q. Z. & AF mode is selectable.

The processing steps of the focus control of the CPU 100 in the case where the Q. Z. & AF mode is selectable is shown by the flowchart in FIG. 22. In the flowchart in FIG. 22, the processings with the same step numbers as in the flowchart in FIG. 17 designate the same processings as in the FIG. 17, thus descriptions thereof will be omitted, and the processings with the step numbers different from the FIG. 17 only will be described. In a step S80 in FIG. 22, the CPU 100 determines whether the quick zoom is on, that is, whether the switch S2 is turned on. If determined no, the flow returns to the step S12. If determined yes, it is determined whether the Q. Z. & AF mode is selected (step S82). If determined no, that is, that the Q. Z. mode is selected, the flow returns to the step S12. When the quick zoom is on, the processing of moving the zoom lens Z to the telephoto end is carried out by the CPU 100, but the processing of the zoom control is omitted in the flowchart in FIG. 22. If determined yes, that is, that the Q. Z. & AF mode is selected in the step S82, the flow proceeds to the processing of the step S20 concurrently with the movement of the zoom lens Z to the telephoto end to start the AF mode processing. Then, it is determined whether the zoom lens Z reaches the telephoto end before the determination processing of the step S26 for proceeding to the AF processing (step S84). If determined no, the flow returns to the step S80, and the AF processing is not started. If determined yes, the flow proceeds to the step S26. When the operator rotationally operates the focus lens F to demand the AF start-up direction before or after the zoom lens Z reaches the telephoto end in the AF standby state, the CPU 100 determines yes in the determination processing of the step S26 to carry out the AF processing. When the quick zoom is turned off, the CPU 100 finishes the processing of the AF mode. The quick zoom may be maintained to be on in the case where the AF focusing is not completed even when the quick zoom is turned off by the operator.

For the processing after completion of focusing by the AF during the quick zoom being on, similarly to the above described aspect, returning to the AF standby state or MF mode, continuing the AF, or focus fine adjustment by the MF may be allowed. The processing after completion of the focusing may be arbitrarily selectable. Further, the same processing may be carried out as the processing after completion of focusing by the AF when the AF mode starting switch S1 is turned on to enter the AF mode. Alternatively, the quick zoom may be forced to be turned off concurrently with returning to the MF mode when the AF focusing is completed even if the quick zoom is on.

Next, switching from the AF standby state to the AF in the AF mode will be described in detail. As described above, in the AF standby state, the CPU 100 waits for the operator to demand the AF start-up direction by the MF operation. Then, when the MF operation is detected, the AF processing is started. That is, the focus lens F is electrically moved in the AF start-up direction demanded by the MF operation, and detection of the focusing position based on the focus evaluation value is simultaneously started. The switching from the AF standby state to the AF may be immediately carried out at the time of detection of the MF operation or at the time of detection of a stop of the MF operation as shown in the flowchart in FIG. 17. However, it is considered that, for example, when the AF mode starting switch S1 is located in the focus ring FR and pressed to enters the AF standby state, the operation causes the focus ring FR to be unexpectedly moved, or that when the focus ring FR is gripped in the AF standby state, the focus ring FR is unexpectedly moved without any intention to move the focus ring FR. With high detection sensitivity of the CPU 100 to the MF operation, there is a possibility of misidentifying a slight motion of the MF operation member such as the focus ring FR as the demand of the AF start-up direction to start the AF in a direction unintended by the operator. For this reason, as a solution thereto, it is preferable to set a dead zone with respect to the MF operation in the AF standby state. That is, when detecting the MF operation in the AF standby state, the CPU 100 determines whether the operation is carried out more than a certain amount, and do not start the AF processing when the operation amount is less than a certain amount, and starts the AF processing when the operation amount is more than a certain amount. Thus, the dead zone can be set with respect to the MF operation in the AF standby state. The size of the dead zone may be adjustable as desired with an adjustment device 132 (such as a variable resistor or rotary switch) shown in FIG. 16 by the operator. As detection of the MF operation amount, the operation amount of the MF operation member may be directly determined, or when the focus lens F is moved by the MF operation, the moving amount may be determined.

When the focus lens F is moved concurrently with the MF operation for demanding the AF start-up direction in the AF standby state, then automatically switching to the AF (the case of the processing of the flowchart in FIG. 17), timing of switching to the AF needs to be considered for rapid focusing. That is, depending on the subject, focusing can be sometimes carried out more rapidly by moving the focus lens F with the MF operation than the AF operation. Thus, it is preferable to be adapted to switch to the AF processing when detecting that the focus evaluation value is more than a predetermined level during the MF operation for demanding the AF start-up direction by the operator.

Figure 23:
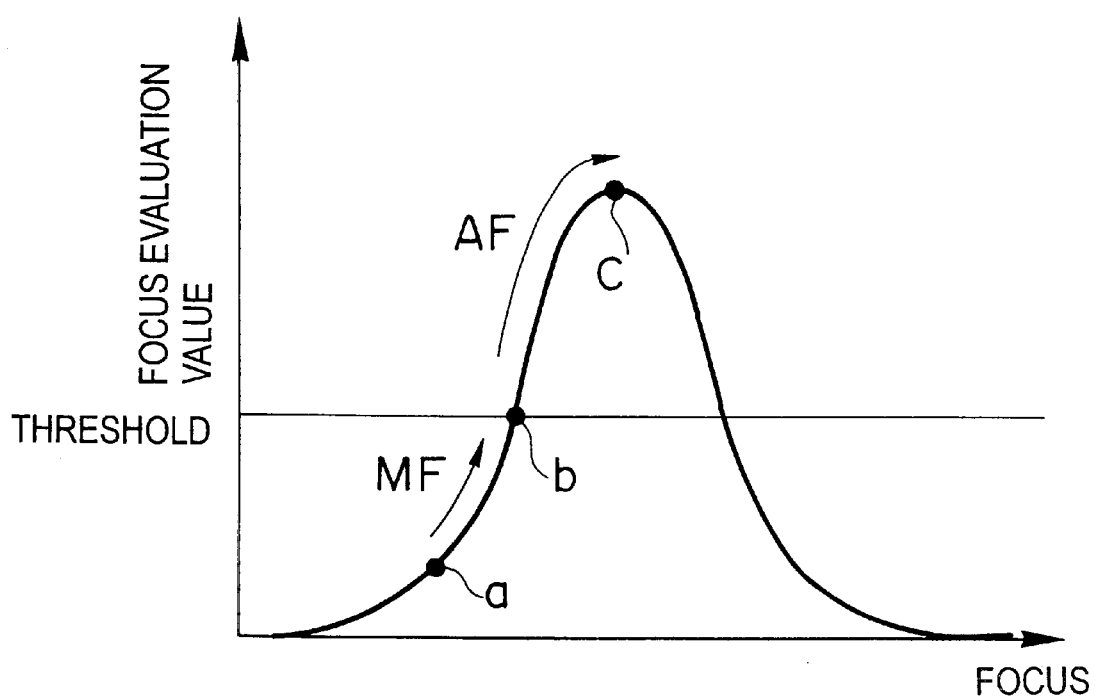
FIG. 23 is an explanatory view used for explaining a processing when providing a threshold for starting an AF processing in the AF mode.

For example, as shown in FIG. 23, a threshold for starting the AF processing is set with respect to the focus evaluation value obtained during the MF operation in the AF standby state. This threshold may be set to an arbitrary value by an adjustment device 134 (such as a valuable resistor or rotary switch) shown in FIG. 16, and the value is provided to the CPU 100 as the threshold. Assuming that the focus position in the AF standby state is a point a in FIG. 23 and that the MF operation is carried out from this point a, the AF processing is not started until the focus position is moved to a point b where the focus evaluation value exceeds the threshold, and the focus lens F is moved by the MF operation. When the focus position reaches the point b, that is, the focus evaluation value exceeds the threshold, the AF processing is started, and the focus position is moved to the focusing position at a point c in FIG. 23 by the AF processing. For the threshold, the CPU 100 automatically changes the value input from the adjustment device 134 to a preferable value in view of a diaphragm value or focus distance (in view of the case of a deep depth of field). The CPU 100 obtains the diaphragm value from a potentiometer located in the iris.

Figure 24:
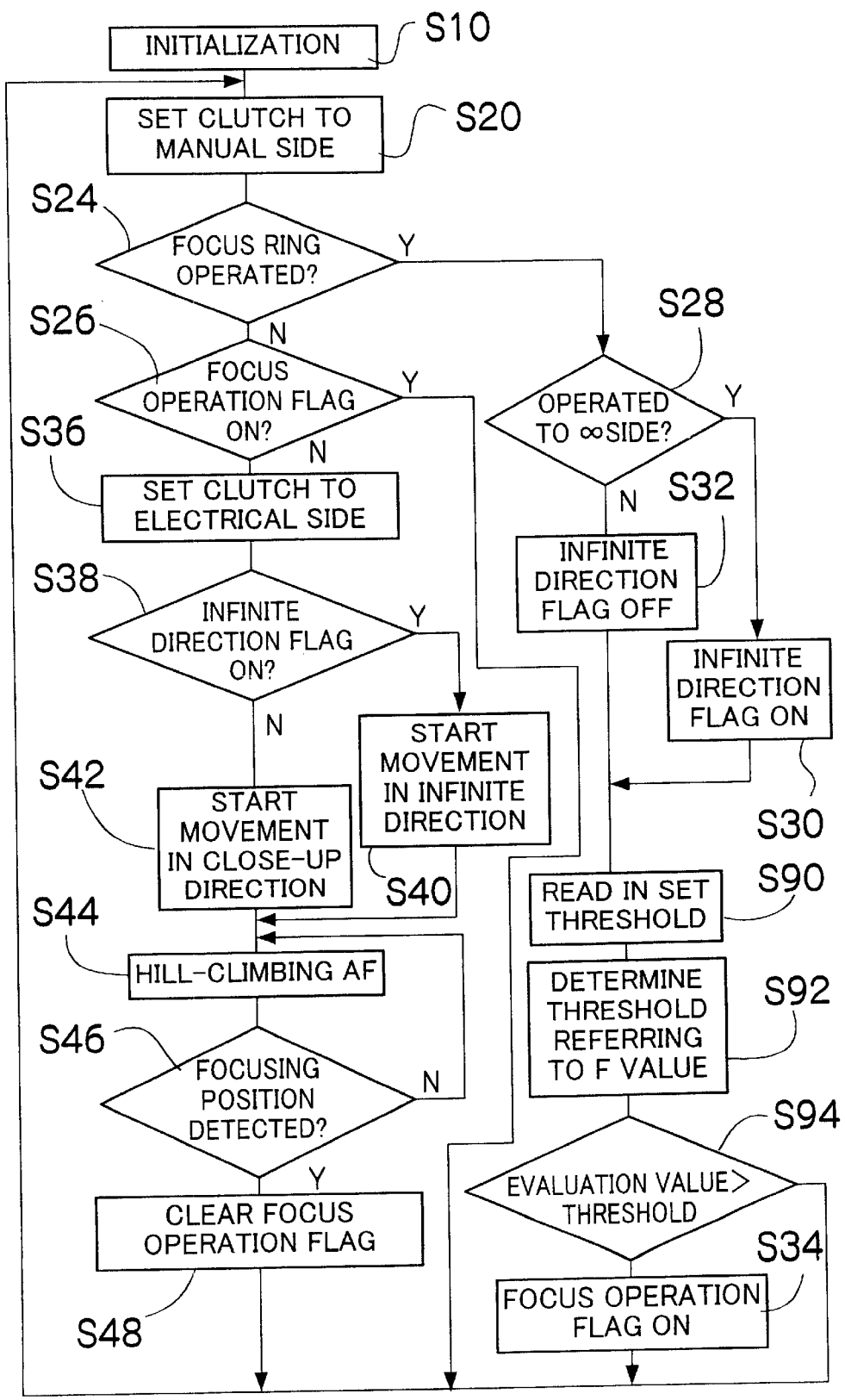
FIG. 24 is a flowchart showing processing steps of a CPU when a threshold for starting the AF processing in the AF mode.

For the processing steps of the CPU 100 in this case, in the processings (steps S20 to S34) in the AF standby state in the AF mode of the flowchart in FIG. 17, steps S90 to S94 shown in a flowchart in FIG. 24 are added after the processing of the step S30 or S32 and before the processing of the step S34. When the operator operates the focus ring FR in the AF standby state, the CPU 100 determined yes in the step S24. Then, the CPU 100 determines whether the operation is carried out in the infinite direction (step S28), and if yes, the infinite direction flag is turned on (step S30). If no, the infinite direction flag is turned off (step S32). Then, the threshold set by the adjustment device 134 is read in (step S90) to determine an appropriate threshold referring to an F value (step S92). Next, it is determined whether the focus evaluation value obtained from an image signal exceeds the threshold (step S94). If determined no, the flow returns to the step S20 without turning on the focus operation flag. This does not cause the AF processing to be started. If determined yes in the step S94, that is, that the focus evaluation value exceeds the threshold, the focus operation flag is turned on (step S34), and the flow returns to the step S20. This causes the AF processing to be started.

Next, control of the clutch FCL in switching from the MF to AF when the focus lens F is moved concurrently with the MF operation for demanding the AF start-up direction in the AF standby state, then automatically switching to the AF will be described. In the processing steps shown by the flowchart in FIG. 17, the clutch FCL is set to the manual side in the AF standby state (step S20), and when the operator rotationally operates the focus ring FR to demand the AF start-up direction, the clutch FCL is switched to the electrical side (step S36) to start the AF processing. In such a case, if the clutch FCL is rapidly switched from the manual to electrical side, rapid torque change occurs to the operation of the focus ring FR to give the operator uncomfortable feeling. Thus, the clutch FCL is switched from the manual side to electrical side as follows. The description below is based on the configuration of the focus driving mechanism of the second embodiment shown in FIG. 6, and between the manual clutch MCL and electrical clutch ECL corresponding to the effect of the clutch FCL in the second embodiment, the manual clutch MCL has an influence on the operation feeling of the focus ring FR, so that the control of the manual clutch MCL will be described.

First, assuming that torque of the FR is TA; torque of the driving ring 50, TB; torque of the helicoids 22A, 24A for moving the focus lens F, TH, operation torque TM of the focus ring FR required for moving the focus lens F by manual operation is expressed by:

$$TM = TA + TB + TH$$

Thus, assuming that torque which can be transmitted by the manual clutch MCL is TC, the TC needs to satisfy:

$$TC > TB + TH$$

for manually moving the focus lens F.

On the other hand, for the focus ring FR not to be rotated by the focus driving motor FM in the AF, the TC needs to satisfy:

$$TC < TA$$

Figure 25:
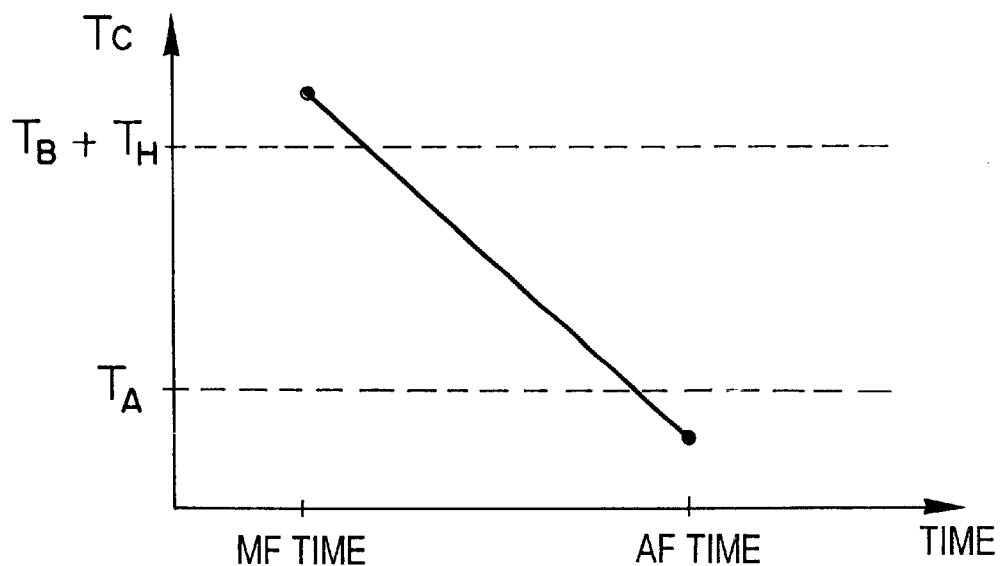
FIG. 25 is an explanatory view used for explaining clutch control in switching to the AF in the AF mode.
Figure 26:
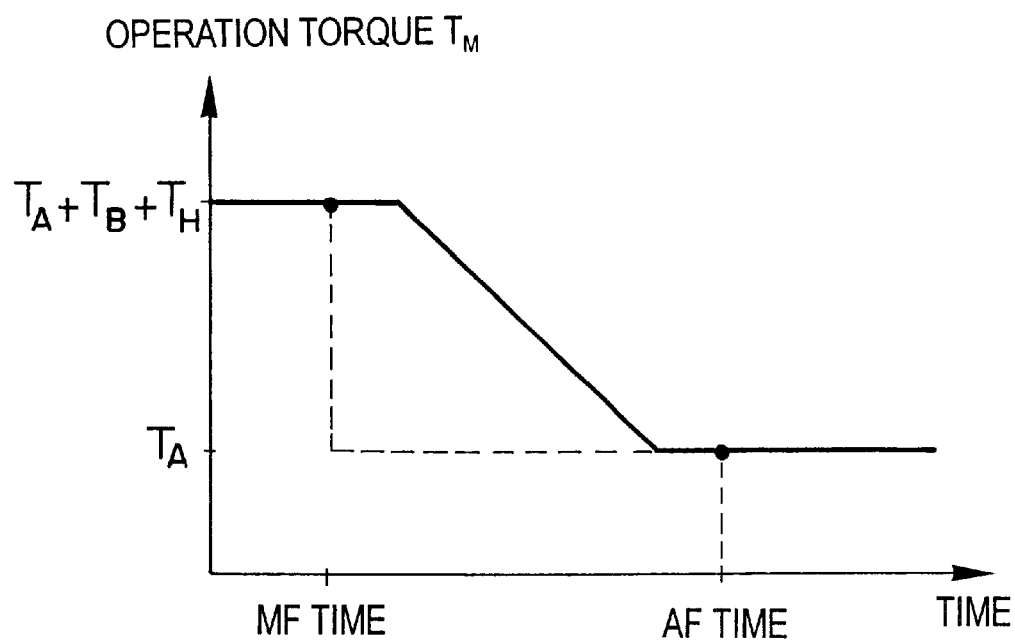
FIG. 26 is an explanatory view used for explaining the clutch control in switching to the AF in the AF mode.

Thus, when moving from the AF standby state (MF time) of moving the focus lens F by manually operating the focus ring FR to the AF of moving the focus lens F by the focus driving motor FM, the TC is changed from the value satisfying TC>TB+TH to a value satisfying TC>TA. At this time, if the TC is rapidly changed, the operation torque TM of the focus ring FR is expressed by:

$$TM=TA+TC$$

within a range where the TC satisfies $(TB+TH) \leq TC \leq TA$, so that the operation torque TM is also rapidly changed. Thus, the TC is gradually reduced as shown in FIG. 25 when moving from the AF standby state (MF time) to the AF. This causes the operation torque TM of the focus ring FR to be gradually reduced from the TA+TB+TH to TA as shown in FIG. 26. In this way, for gradually reducing the TC, a pressing force of the clutch plate 82 against the clutch plate 80 may be gradually reduced, which can be carried out by controlling rotational rate of the clutch motor FCM.

The control of the manual clutch MCL described above is similarly applied to the case of other types of focus driving mechanisms. That is, by controlling a state of the clutch FCL (the first embodiment) or the locking device (the third embodiment) so as to gradually move from the manual focus driving state to the electrical focus driving state, uncomfortable feeling of the operation of the focus ring FR in switching from the manual to electrical operation can be reduced.

The above description of switching from the AF standby state to the AF is not limited to the case applied in the AF mode having the AF standby state for demanding the AF start-up direction. That is, the switching can be applied to a case of such as automatically switching from the focus driving state by the MF operation to the AF.

In the above embodiments, the present invention is described in the lens apparatus having the focus ring FR, but the description on the focus control can be similarly applied to a lens apparatus without any focus ring.

As described above, according to the lens apparatus of the present invention, when the operator demands the moving direction of the focus lens, the focus lens is started to be moved in that direction and set to the focusing position existing in the direction, so that focusing can be rapidly carried out in the autofocus if the operator appropriately demands the moving direction. Further, the operator needs only to demand the moving direction of the focus lens, thereby reducing burdens in the focus adjustment.

As described above, according to the lens apparatus of the present invention, when the start of the autofocus mode is instructed, the AF standby state of waiting for the operator to demand the moving direction of the focus lens, that is, the AF start-up direction by operating the focus operation member used in the manual focus is set, so that an operator can demand the autofocus start-up direction with the same feeling as the manual focus. Also, by recognizing the operation of the focus operation member in the AF standby state as the demand of the AF start-up direction, the demand can be appropriately determined.

The function of the quick zoom is generally used when a desired subject is to be zoomed and focused with high accuracy, and automatically switching to the autofocus mode in an interlocked manner with the start of the quick zoom can save trouble of the operation for starting the autofocus mode by the operator.

As described above, according to the lens apparatus of the present invention, when automatically switching from the state where the operator operates the focus operation member to the autofocus, the condition of the switching is that the focus evaluation value exceeds the predetermined threshold, so that the autofocus can be started at a level of the focus evaluation value where no malfunction of the autofocus occurs, permitting rapid focusing.

Further, the condition of switching to the autofocus is that the moving amount of the focus lens which moves according to the operation of the focus operation member, or the operation amount of the focus operation member changes more than the predetermined amount, so that the dead zone can be provided on the focus operation member, preventing defects such as the start of the autofocus by the slight motion of the focus operation member unintended by the operator to improve operability.

Further, gradually switching a clutch, which switches focus lens driving from manual to electrical operation, from the manual to electrical state can eliminates the defect of rapid change of the operation force of the focus operation member for manually driving the focus lens by switching to the autofocus, and the uncomfortable operation feeling of the focus operation member in switching to the autofocus.

As described above, according to the lens apparatus of the present invention, for the processing after completion of focusing in the autofocus mode, at least two mode can be selected among the mode of returning to the AF standby state of waiting for the operator to demand the AF start-up direction, mode of automatically finishing the autofocus mode, and mode of moving the focus lens based on the image signal from the camera in such a manner that the focus lens is always in the focusing position, which permits selecting a preferable mode depending on the operator's preference or the situation, and achieving improvement of convenience of the autofocus mode.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens apparatus, comprising:

a focus lens;

a moving direction demanding device through which an operator demands a moving direction of the focus lens;

a moving direction determining device which determines the moving direction of the focus lens demanded with the moving direction demanding device; and an autofocus device which electrically moves the focus lens in the moving direction determined by the moving direction determining device, detects a focusing position existing in the moving direction, and sets the focus lens to the detected focusing position.

2. The lens apparatus according to claim 1, further comprising:

a manual focus device which includes a focus operation member and moves the focus lens according to operation of the focus operation member by the operator, wherein in a processing by the autofocus device, the focus operation member is used as the moving direction demanding device, and operation of the focus operation member in one of an infinite direction and a close-up direction is determined as the moving direction by the moving direction determining device.

3. The lens apparatus according to claim 2, wherein the focus operation member is operated by the operator for moving the focus lens one of electrically and manually.

4. The lens apparatus according to claim 3, further comprising:

a lens barrel comprising:
  a barrel body which holds the focus lens movably in an optical axis direction;

a driving ring which is rotatably disposed on an outer periphery of the barrel body and moves the focus lens in the optical axis direction by rotation; and a focus ring which is disposed on an outer periphery of the driving ring rotatably with respect to the driving ring;

a focus driving motor; and a switching and connecting device which switches and connects between an electrical time power transmission state of transmitting power from the focus driving motor to the driving ring and a manual time power transmission state of transmitting power from the focus ring to the driving ring, wherein when electrically moving the focus lens, the switching and connecting device switches the state to the electrical time power transmission state, and drives the focus driving motor causing the driving ring to be rotated to move the focus lens, wherein when manually moving the focus lens, the switching and connecting device switches the state to the manual time power transmission state, and rotational operation of the focus ring causes the driving ring to be rotated to move the focus lens.

5. A lens apparatus, comprising:

a focus lens;

a manual focus device which includes a focus operation member and moves the focus lens according to operation of the focus operation member by an operator;

an autofocus mode start demanding device through which the operator demands a start of an autofocus mode;

an autofocus standby state setting device which sets to an autofocus standby state of waiting for the operator to demand a moving direction of the focus lens by the operation of the focus operation member when the start of the autofocus mode is demanded with the autofocus mode start demanding device;

a moving direction determining device which determines the moving direction of the focus lens demanded by the operation of the focus operation member in the autofocus standby state; and an autofocus device which controls autofocus when the moving direction of the focus lens is determined by the moving direction determining device in such a manner as to electrically move the focus lens in the determined moving direction, detect a focusing position existing in the moving direction, and set the focus lens to the detected focusing position.

6. The lens apparatus according to claim 5, wherein the manual focus device is effective in the autofocus standby state, and is ineffective in the autofocus control by the autofocus device.

7. The lens apparatus according to claim 5, further comprising:

a zoom lens; and a quick zoom switch, wherein:

when a start of a quick zoom is demanded by on/off operation of the quick zoom switch, the zoom lens is moved to a telephoto end;

when a finish of the quick zoom is demanded by on/off operation of the quick zoom switch, the zoom lens is returned to an original position; and the autofocus mode start demanding device demands the start of the autofocus mode concurrently with the start of the quick zoom.

8. The lens apparatus according to claim 7, wherein when the moving direction of the focus lens is determined by the moving direction determining device and the zoom lens reaches the telephoto end, the autofocus device electrically moves the focus lens in the moving direction, detects the focusing position existing in the moving direction, and sets the focus lens to the detected focusing position.

9. The lens apparatus according to claim 7, wherein the autofocus device finishes the autofocus control when the finish of the quick zoom is demanded.

10. The lens apparatus according to claim 7, wherein when the focus lens is set to the focusing position by the autofocus device, the finish of the quick zoom is demanded.

11. A lens apparatus, comprising:

a focus lens;

a manual focus device which includes a focus operation member and moves the focus lens according to operation of the focus operation member by an operator;

an autofocus device which obtains a focus evaluation value to be maximum at a focusing position from an image signal of a camera to which the lens apparatus is connected, and sets the focus lens to the focusing position according to the focus evaluation value; and a focus control device which obtains the focus evaluation value concurrently with movement of the focus lens by the manual focus device, and sets, when the focus evaluation value exceeds a threshold, the focus lens to the focusing position by the autofocus device.

12. The lens apparatus according to claim 11, further comprising an adjustment device which adjusts the threshold.

13. A lens apparatus, comprising:

a focus lens;

a manual focus device which includes a focus operation member and moves the focus lens according to operation of the focus operation member by an operator;

a focusing position detecting device which detects a focusing position of the focus lens;

an autofocus device which sets the focus lens to the focusing position according to information from the focusing position detecting device; and a focus control device which sets the focus lens to the focusing position by the autofocus device when one of a moving amount of the focus lens by the manual focus device and an operation amount of the focus operation member is changed more than a predetermined amount.

14. The lens apparatus according to claim 13, further comprising an adjustment device which adjusts the predetermined amount.

15. A lens apparatus, comprising:

a focus lens;

a clutch which switches between a manual state of manually moving the focus lens and an electrical state of electrically moving the focus lens;

a manual focus device which includes a focus operation member and manually moves the focus lens according to operation of the focus operation member by an operator;

a focusing position detecting device which detects a focusing position of the focus lens;

an autofocus device which electrically moves the focus lens to be set to the focusing position according to information from the focusing position detecting device; and a clutch control device which gradually switches the clutch from the manual to electrical state when switching from the manual focus device to the autofocus device.

16. A lens apparatus which has a function of an autofocus mode where when a start of an autofocus mode is demanded, an autofocus standby state of waiting for an operator to demand an autofocus start-up direction is raised, and when the operator demands the autofocus start-up direction in the autofocus standby state, a focus lens is moved in the demanded start-up direction, and set to a focusing position based on information from a focusing position detecting device which detects the focusing position, wherein for processings after the focus lens is set to the focusing position in the autofocus mode, at least two modes is selectable among a first mode of returning to the autofocus standby state, a second mode of automatically finishing the autofocus mode, and a third mode of moving the focus lens to the focusing position according to the information from the focusing position detecting device in such a manner that the focus lens is always in the focusing position.

17. The lens apparatus according to claim 16, wherein a mode is provided in the third mode which allows the focus lens to be moved by operating a focus operation member by the operator until a predetermined demand operation by the operator when the focus lens is set to the focusing position.

* * * * *